(12) United States Patent
Park et al.

(10) Patent No.: US 11,240,719 B2
(45) Date of Patent: Feb. 1, 2022

(54) HANDOVER METHOD IN WIRELESS COMMUNICATION SYSTEM AND APPARATUS THEREFOR

(71) Applicant: LG ELECTRONICS INC., Seoul (KR)

(72) Inventors: Sangmin Park, Seoul (KR); Taehun Kim, Seoul (KR); Myungjune Youn, Seoul (KR); Hyunsook Kim, Seoul (KR); Jinsook Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/765,463

(22) PCT Filed: Nov. 16, 2018

(86) PCT No.: PCT/KR2018/014086
§ 371 (c)(1),
(2) Date: May 19, 2020

(87) PCT Pub. No.: WO2019/098745
PCT Pub. Date: May 23, 2019

(65) Prior Publication Data
US 2020/0322857 A1    Oct. 8, 2020

Related U.S. Application Data

(60) Provisional application No. 62/588,415, filed on Nov. 19, 2017.

(51) Int. Cl.
*H04W 36/00* (2009.01)
*H04W 36/12* (2009.01)
(Continued)

(52) U.S. Cl.
CPC ....... *H04W 36/12* (2013.01); *H04W 36/0016* (2013.01); *H04W 36/0033* (2013.01); *H04W 76/22* (2018.02); *H04W 76/34* (2018.02)

(58) Field of Classification Search
CPC . H04W 36/12; H04W 36/00; H04W 36/0016; H04W 36/0033; H04W 76/22; H04W 76/34
See application file for complete search history.

(56) References Cited

U.S. PATENT DOCUMENTS

2014/0123222 A1    5/2014    Omar
2017/0289898 A1    10/2017   Youn et al.
(Continued)

FOREIGN PATENT DOCUMENTS

CN    106851856    6/2017
WO    2017164674   9/2017

OTHER PUBLICATIONS

"3rd Generation Partnership Project; Technical Specification Group Services and System Aspects; Procedures for the 5G System; Stage 2 (Release 15)", Nov. 14, 2017, XP051391718 (Year: 2017).*
(Continued)

*Primary Examiner* — Nathan S Taylor
(74) *Attorney, Agent, or Firm* — Lee Hong Degerman Kang & Waimey

(57) ABSTRACT

According to one aspect of the present invention, a method for supporting a user equipment (UE) handover of a target (T)-access and mobility management function (AMF) in a wireless communication system may comprise the steps of: receiving a UE context creation request message from a source (S)-AMF, wherein the UE context creation request message includes packet data unit (PDU) session identifiers (ID) as a handover target and single (S)-network slice selection assistance information (NSSAI) corresponding to each PDU session ID; determining whether the correspond-
(Continued)

ing S-NSSAI is valid in the T-AMF; and sending, to a session management function (SMF), a PDU session update session management (SM) context request message only for a PDU session ID that corresponds to the S-NSSAI determined to be valid according to the determination result, out of the PDU session IDs.

4 Claims, 12 Drawing Sheets

(51) Int. Cl.
*H04W 76/34* (2018.01)
*H04W 76/22* (2018.01)

(56) References Cited

U.S. PATENT DOCUMENTS

| | | | | |
|---|---|---|---|---|
| 2018/0332523 | A1* | 11/2018 | Faccin | H04W 36/14 |
| 2019/0098536 | A1* | 3/2019 | Qiao | H04W 36/0016 |
| 2019/0098537 | A1* | 3/2019 | Qiao | H04W 36/0033 |
| 2019/0124561 | A1* | 4/2019 | Faccin | H04W 48/18 |
| 2019/0159015 | A1* | 5/2019 | Qiao | H04W 8/065 |
| 2020/0059989 | A1* | 2/2020 | Velev | H04W 36/12 |
| 2020/0112898 | A1* | 4/2020 | Ramle | H04W 36/08 |
| 2020/0120570 | A1* | 4/2020 | Youn | H04W 36/0033 |
| 2020/0245127 | A1* | 7/2020 | Zong | H04W 76/12 |
| 2020/0337093 | A1* | 10/2020 | Kim | H04W 64/00 |
| 2020/0359291 | A1* | 11/2020 | Ramle | H04W 48/18 |

OTHER PUBLICATIONS

European Patent Office Application Serial No. 18879822.7, Search Report dated Oct. 13, 2020, 11 pages.
Samsung, "TS 23.501: OI#4c. Allowed NSSAI in a new RA," SA WG2 Meeting #123, S2-177444, Oct. 2017, 4 pages.
Fricsson, "Slice and AMF selection at HO procedure," 3GPP TSG-SA WG2 Meeting #125, S2-180111, Jan. 2018, 23 pages.
3rd Generation Partnership Project (3GPP), "Technical Specification Group Services and System Aspects; Procedures for the 5G System; Stage 2 (Release 15)," 3GPP TS 23.502 V1.3.0, Nov. 2017, 284 pages.
3rd Generation Partnership Project (3GPP), "Technical Specification Group Radio Access Network; NG Radio Access Network (NG-RAN); NG Application Protocol (NGAP); (Release 15)," 3GPP TS 38.413 V0.4.0, Oct. 2017, 88 pages.
Convida Wireless LLC, ZTE, "TS 23.501: Mapping the S-NSSAI's to S-NSSAI(s) in the Configured NSSAI ," SA WG2 Meeting #123, S2-177272, Oct. 2017, 2 pages.
Qualcomm Incorporated, "TS 23.502: PDU session ID association in HO procedure," SA WG2 Meeting #123, S2-177636, Oct. 2017, 3 pages.
PCT International Application No. PCT/KR2018/014086, International Search Report dated Mar. 5, 2019, 6 pages.
The State Intellectual Property Office of the People's Republic of China Application Serial No. 201880074597.0, Office Action dated Sep. 3, 2021, 11 pages.
Ericsson, "OI 4c: Handoverand slicing", S2-176981, SA WG2 Meeting #123, Oct. 2017, 23 pages.
Huawei, HiSilicon, "TS 23.502 SMF information context synchronization between old AMF and new AMF", S2-175643, SA WG2 Meeting #122B, Aug. 2017, 17 pages.
Huawei, HiSilicon, "TS 23.502 SMF information context synchronization between old AMF and new AMF", S2-177852, SA WG2 Meeting #123, Oct. 2017, 17 pages.
Huawei, "Clarification on Allowed NSSAI, 38.413", R3-174689, 3GPP TSG-RAN WG3 #98 Meeting, Dec. 2017, 6 pages.
Huawei, HiSilicon, "TS 23.502 SMF information context synchronization between old AMF and new AMF", S2-178072, SA WG2 Meeting #123, Oct. 2017, 17 pages.
Huawei, HiSilicon, "TS 23.502 SMF information context synchronization between old AMF and new AMF", S2-177136, SA WG2 Meeting #123, Oct. 2017, 17 pages.
"Fuzzy-Free Radial Velocity Estimation of Side-Looking Radar Based on Signal Fitting and Target Tracking", Apr. 2008, 8 pages.

* cited by examiner

【Figure 1】
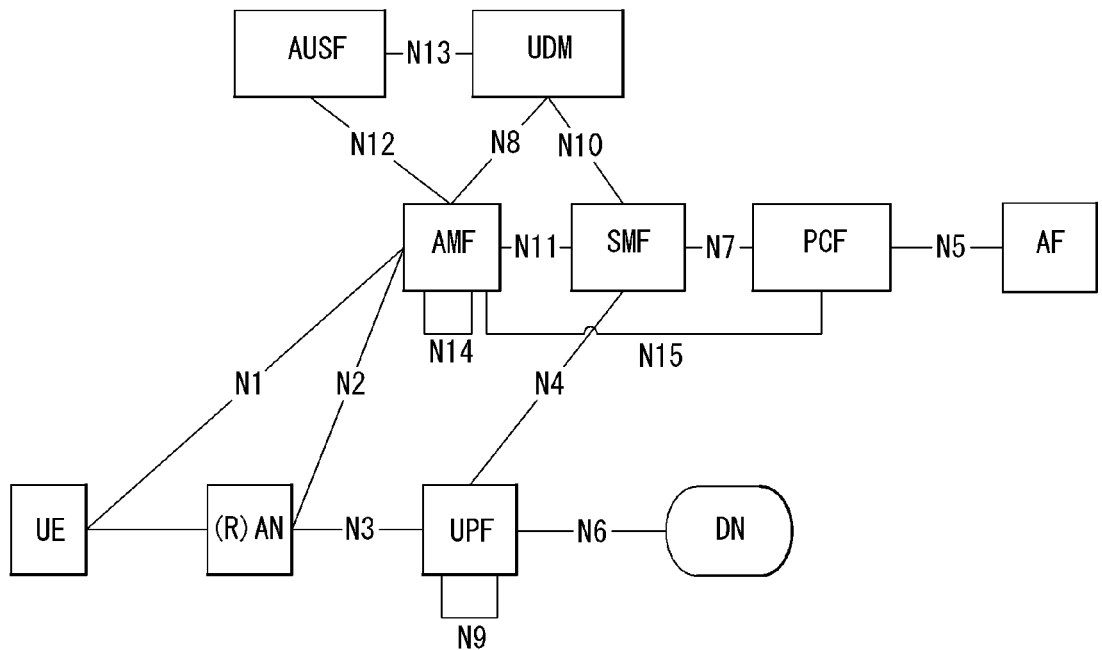
【Figure 2】
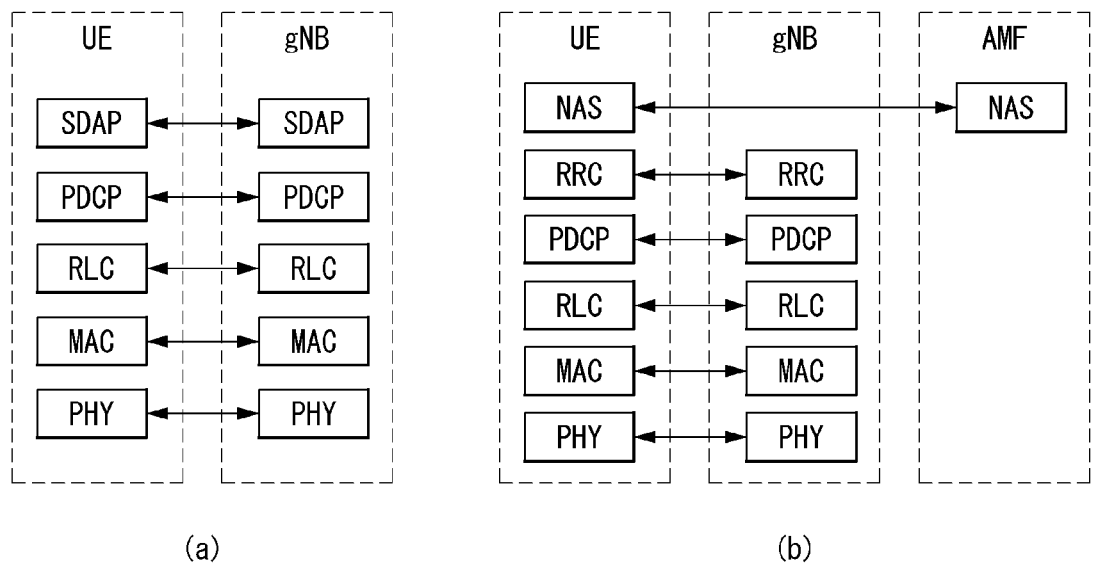
(a)　　　　　　　　　　　　(b)

【Figure 3】
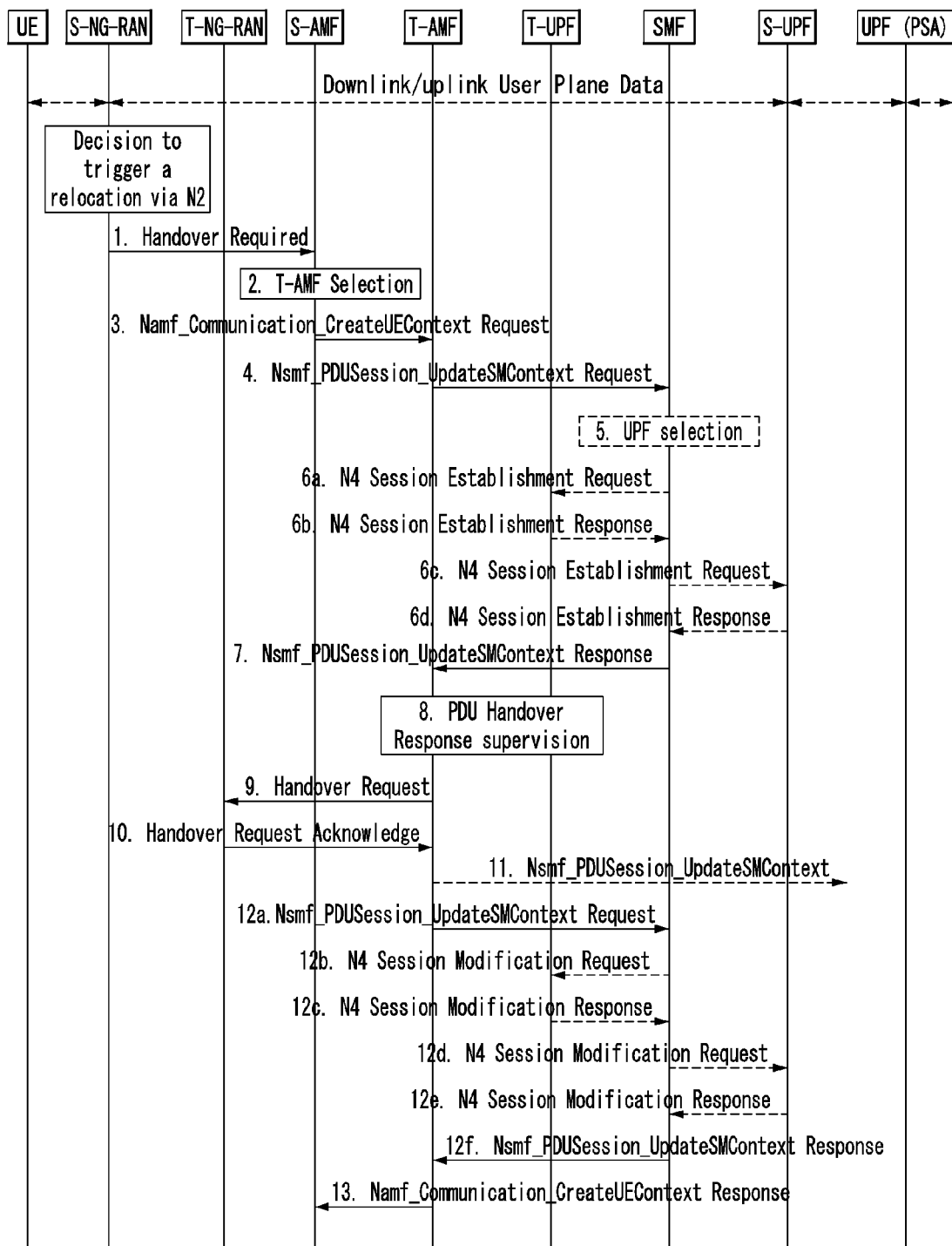

【Figure 4】
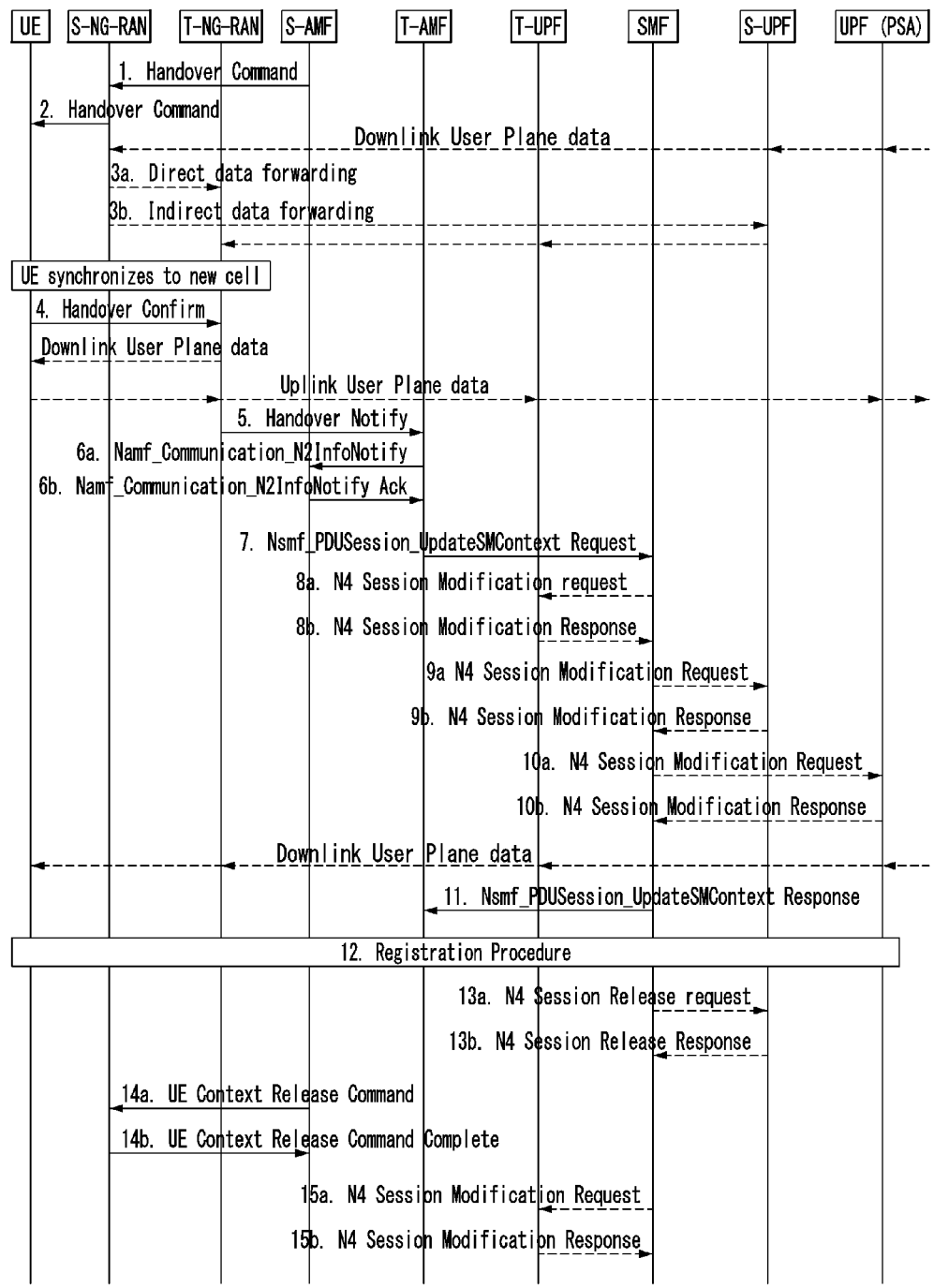

【Figure 5】
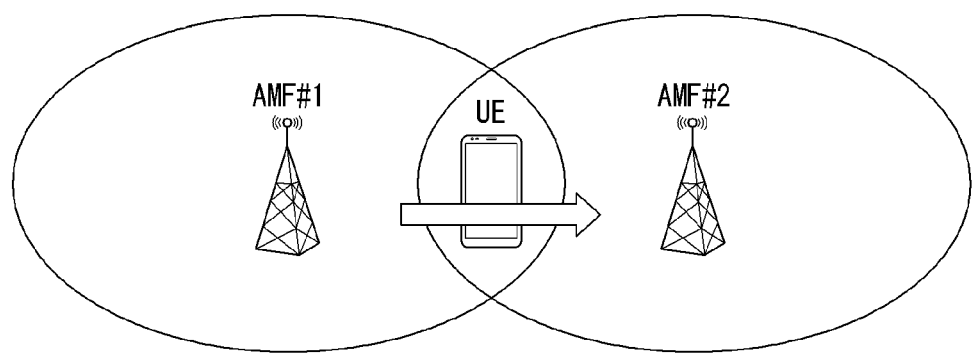

【Figure 6】
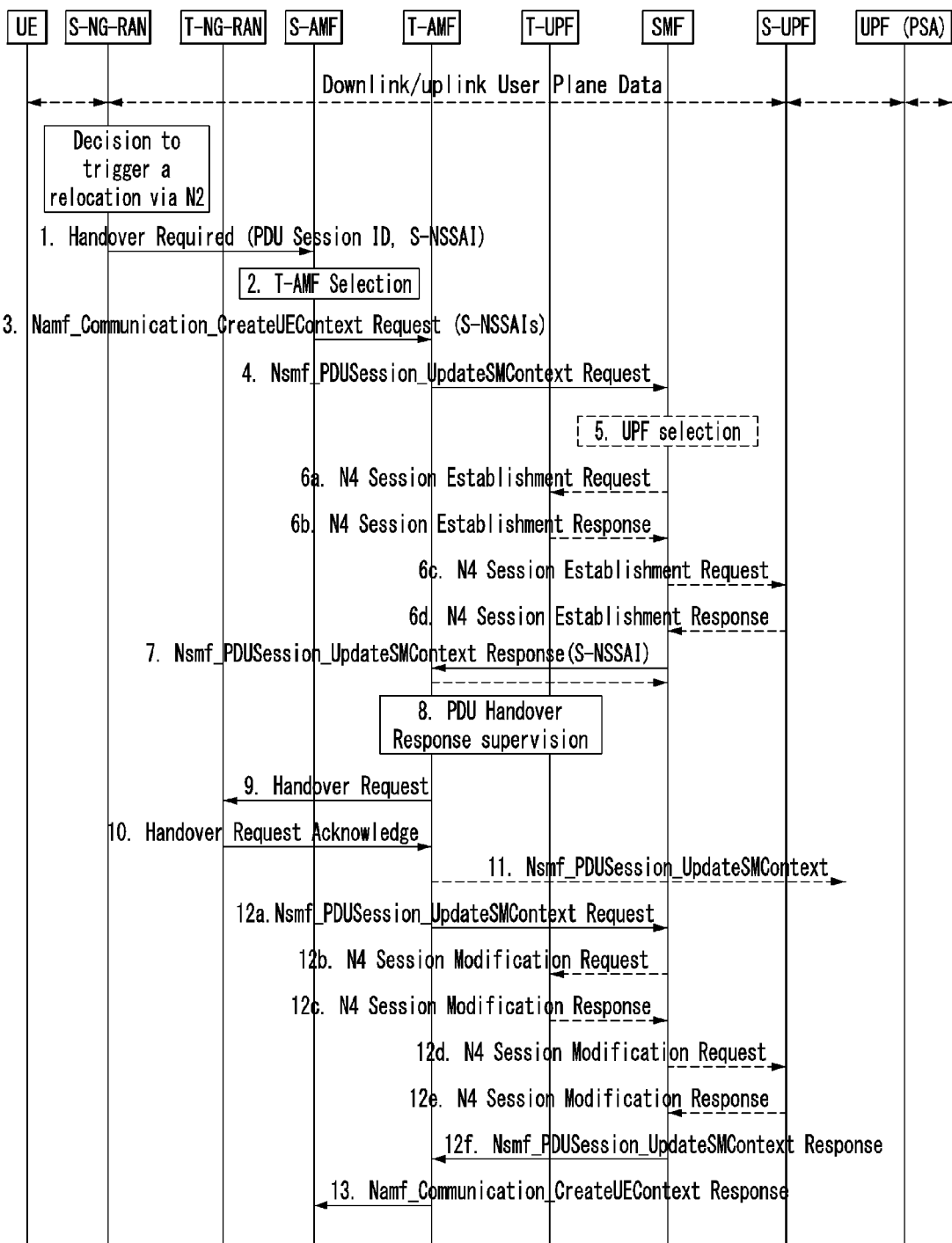

【Figure 7】
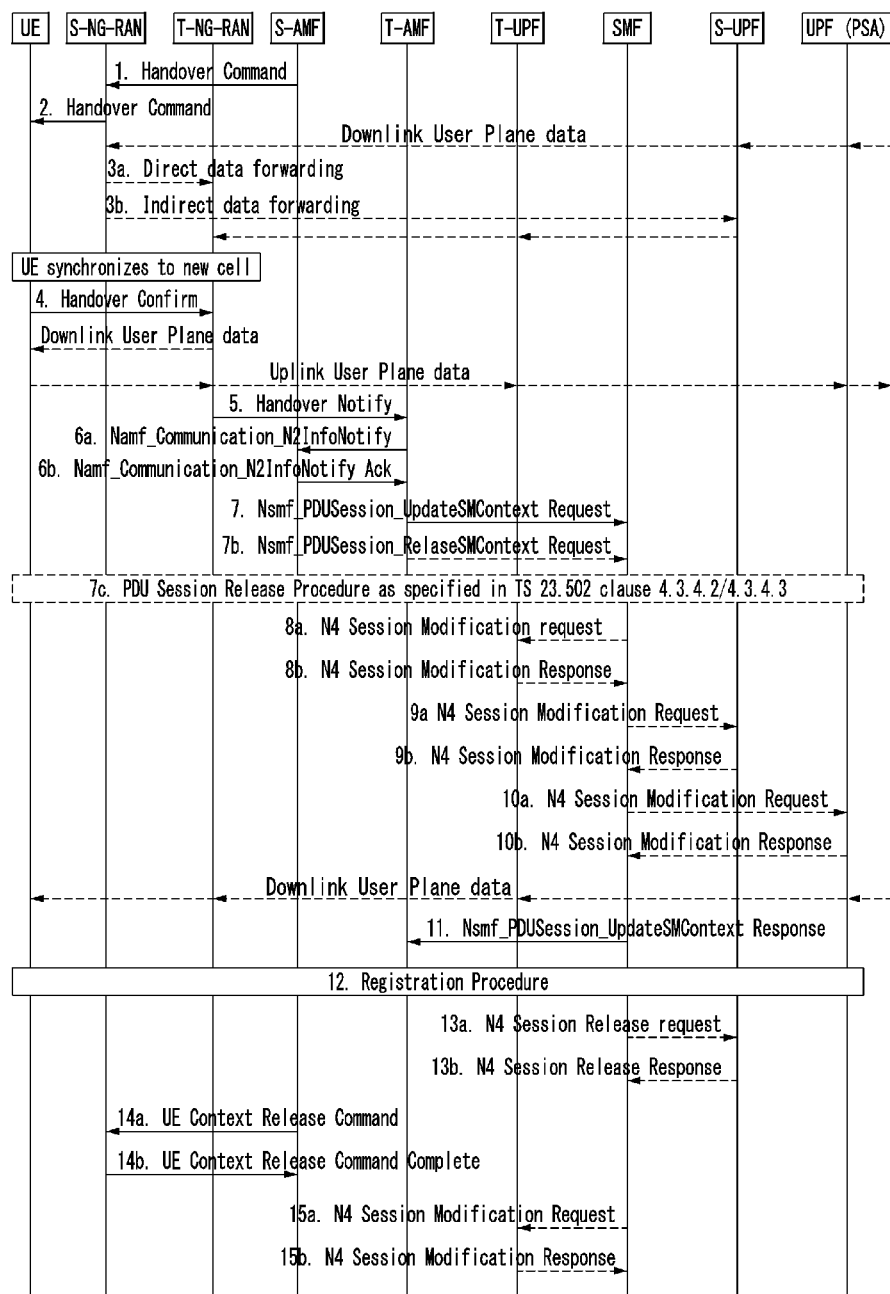

[Figure 8]
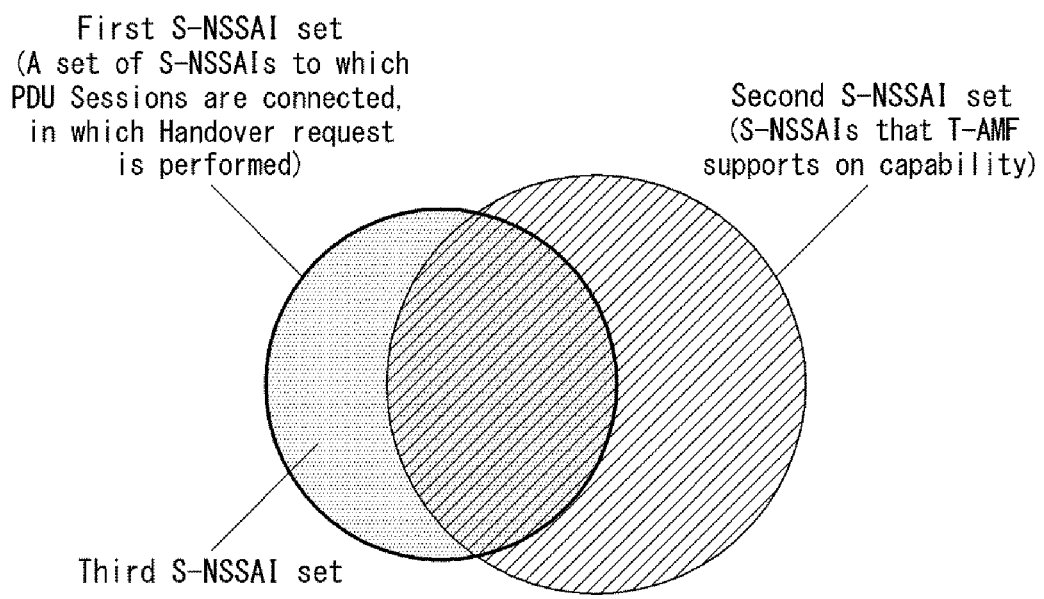

[Figure 9]
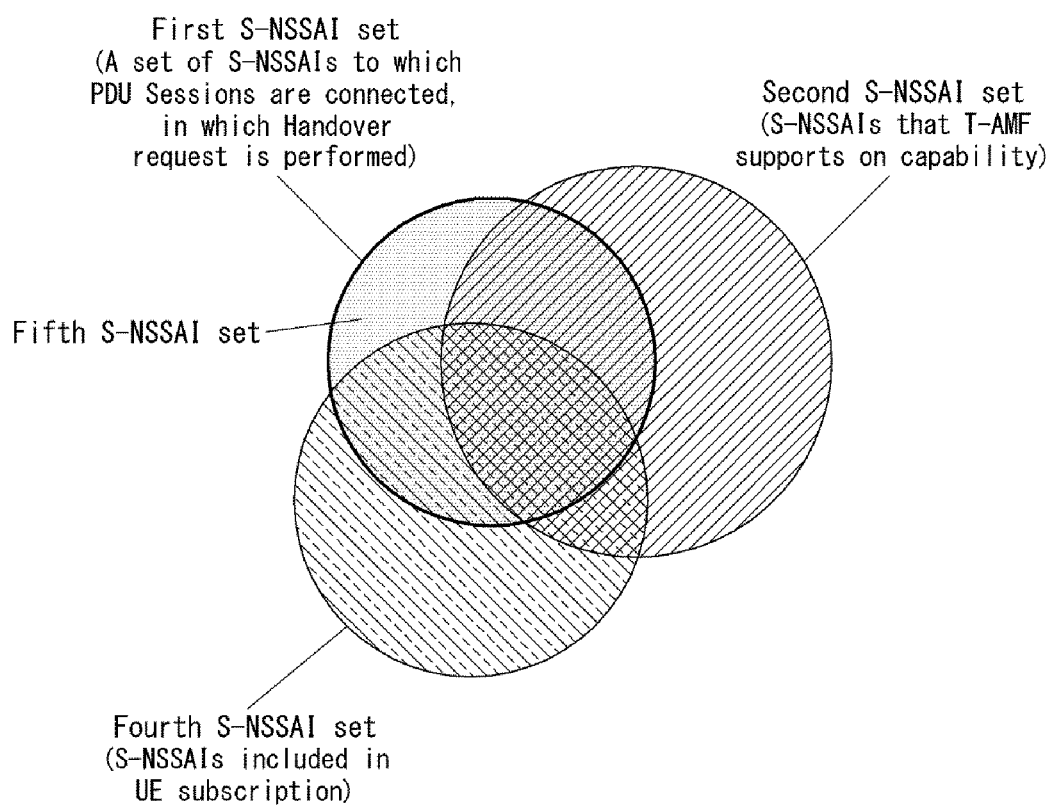

[Figure 10]
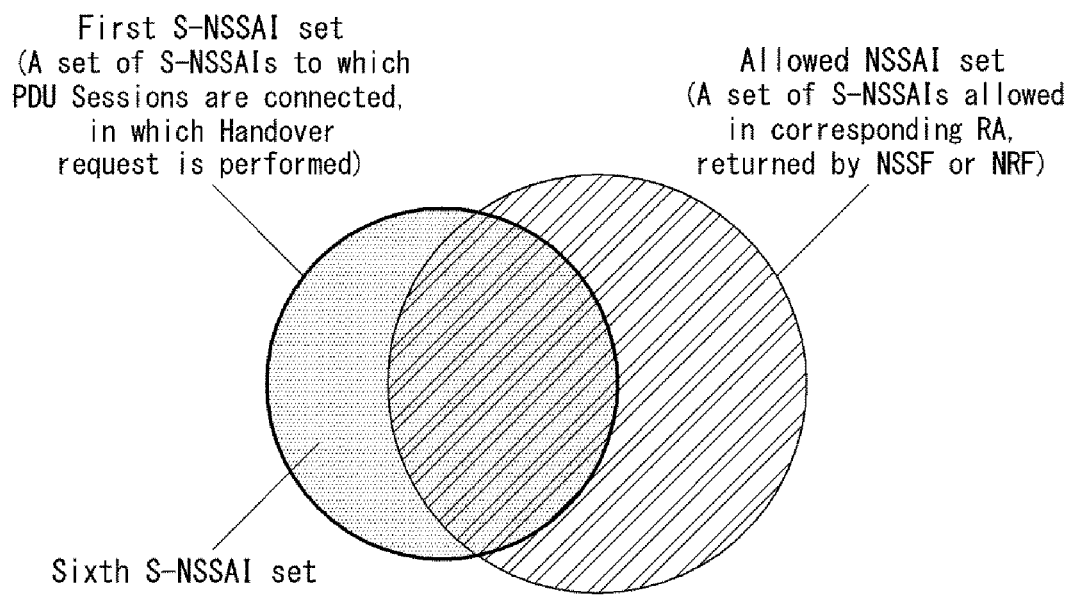

【Figure 11】
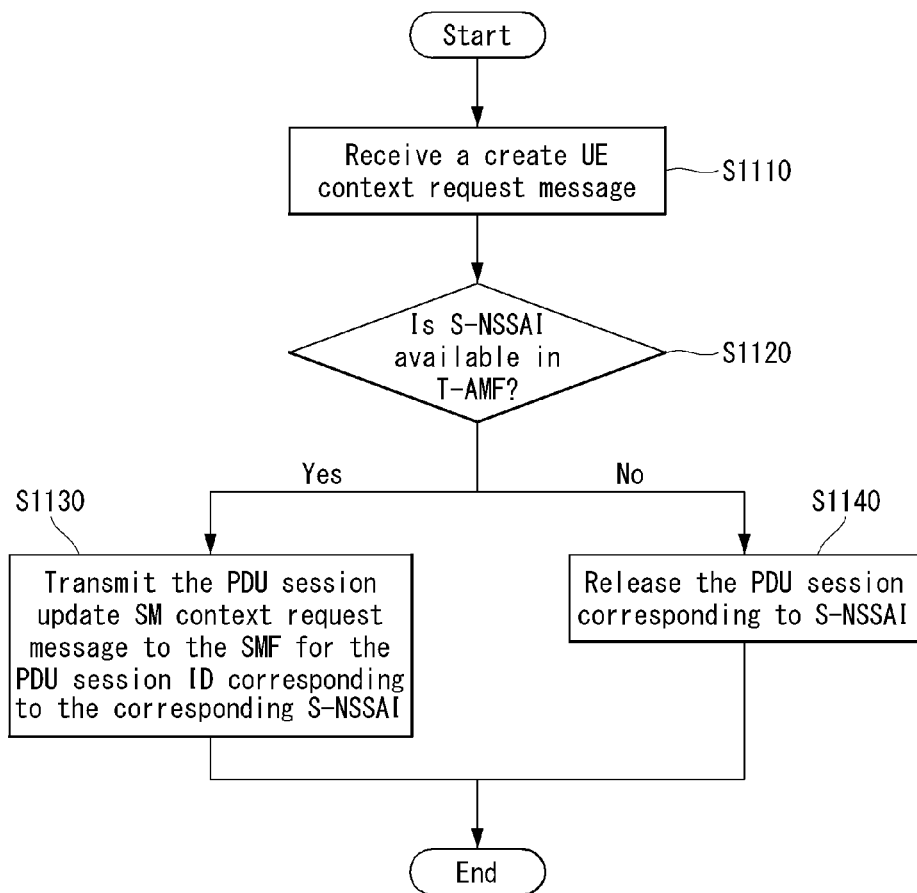

【Figure 12】
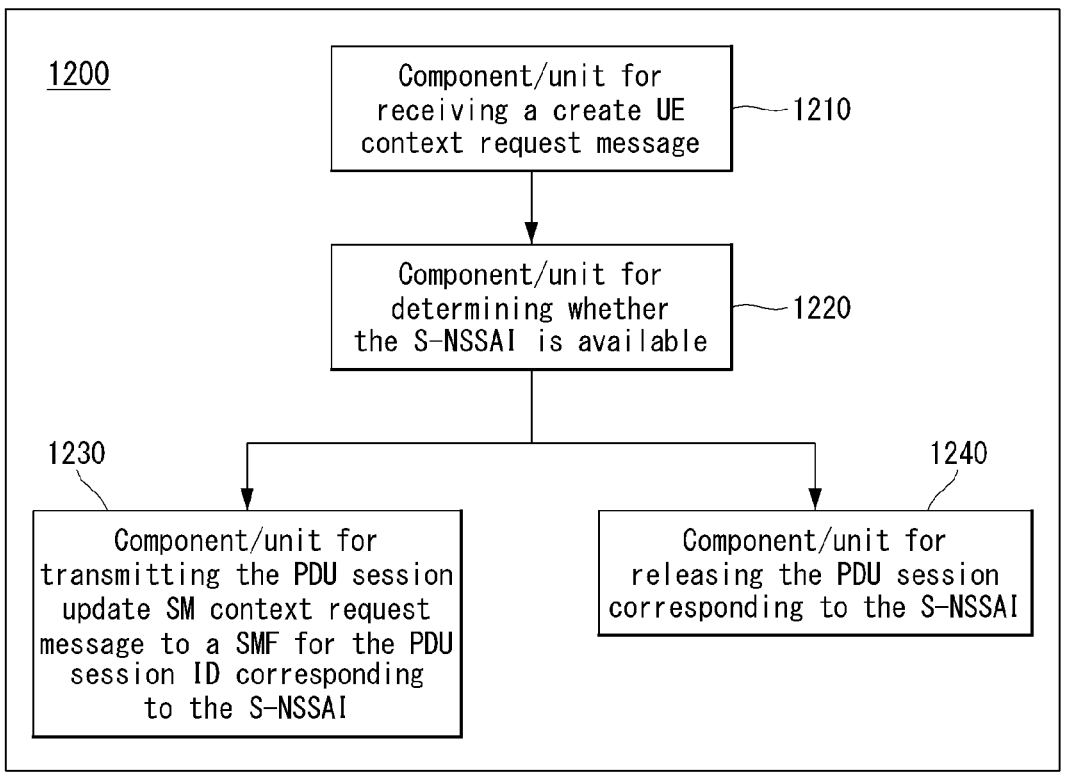
【Figure 13】
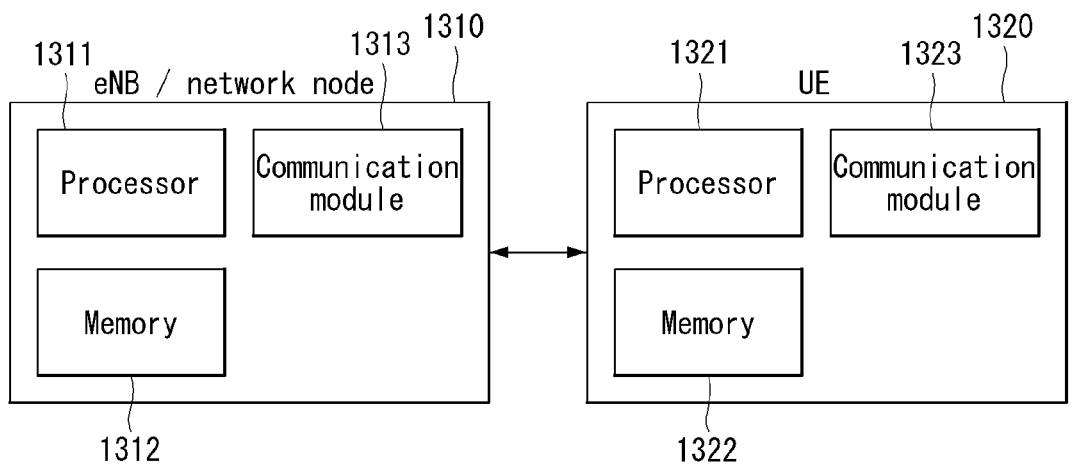

[Figure 14]
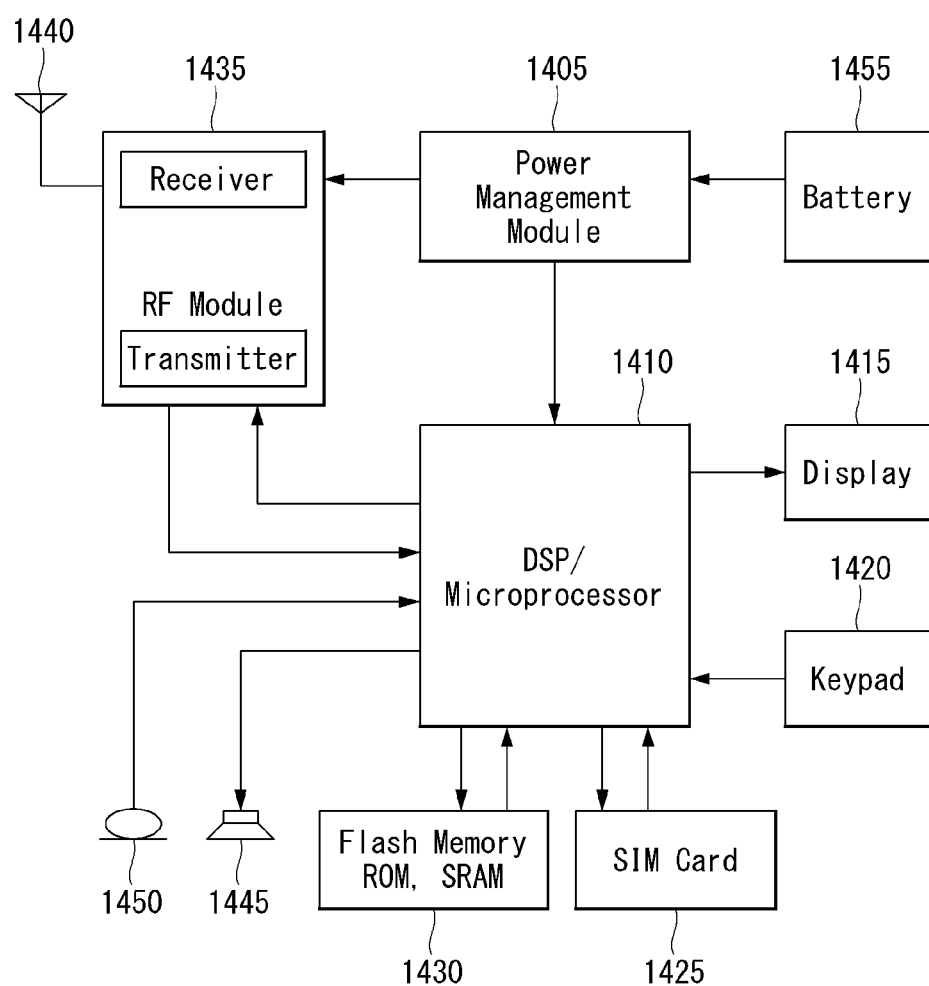

HANDOVER METHOD IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/014086, filed on Nov. 16, 2018, which claims the benefit of U.S. Provisional Application No. 62/588,415, filed on Nov. 19, 2017, the contents of which are all hereby incorporated by reference herein in their entirety.

TECHNICAL FIELD

The present disclosure relates to a wireless communication system and, more particularly, to a method for supporting UE handover efficiently and an apparatus for the same.

BACKGROUND ART

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low End-to-End Latency, and high-energy efficiency. To this end, various technologies have been researched, which include Dual Connectivity, Massive Multiple Input Multiple Output (Massive MIMO), In-band Full Duplex, Non-Orthogonal Multiple Access (NOMA), Super wideband support, Device Networking, and the like.

Particularly, recently, for a device that power consumption influences significantly on the lifetime of the device, various techniques for reducing power consumption have been vigorously researched.

DISCLOSURE

Technical Problem

The present disclosure is to propose a method for supporting handover procedure of UE efficiently by preventing unnecessary signaling and resource allocation, when handover procedure accompanied by UE mobility is performed.

Technical problems to be solved by the present disclosure are not limited by the above-mentioned technical problems, and other technical problems which are not mentioned above can be clearly understood from the following description by those skilled in the art to which the present disclosure pertains.

Technical Solution

As an aspect of the present disclosure, a method for supporting a User Equipment (UE) handover of a Target-Access and Mobility Management Function (T-AMF) in a wireless communication system may include receiving, from a Source-AMF (S-AMF), a create UE context request message, wherein the create UE context request message includes a Packet Data Unit (PDU) session Identifier (ID) which is a target of handover and Single-Network Slice Selection Assistance Information (S-NSSAI) corresponding to each PDU session ID; determining whether the corresponding S-NSSAI is available in the T-AMF; and based on a result of the determination, transmitting a PDU session update Session Management (SM) context request message to a Session Management Function (SMF) only for the PDU session ID corresponding to the S-NSSAI determined to be available among the PDU session IDs.

In addition, the SMF may be a network node that determines whether handover for the PDU session ID corresponding to the S-NSSAI determined to be available is accepted.

In addition, the method for supporting handover may further include receiving a PDU session update SM context response message in response to the PDU session update SM context request message, wherein the PDU session update SM context response message may include a PDU session ID of which handover is accepted by the SMF.

In addition, the method for supporting handover may further include generating a non-accepted PDU session list including (i) a PDU session ID for which handover is not accepted by the T-AMF and/or the SMF, (ii) and a cause of non-acceptance for the PDU session ID for which handover is not accepted.

In addition, the PDU session ID for which handover is not accepted by the T-AMF may be a PDU session ID corresponding to the S-NSSAI determined to be non-available based on the result of the determination.

In addition, the cause of non-acceptance of handover may include a cause indicating that the handover is not accepted by the T-AMF because of the non-available S-NSSAI in the T-AMF.

In addition, the non-accepted PDU session list may be transmitted to a Target-Radio Access Network (T-RAN).

In addition, the PDU session non-accepted by the T-AMF may be released after receiving a handover notification indicating handover is completed from the T-RAN.

In addition, the release may be triggered based on a PDU session release SM context request message including the PDU session non-accepted by the T-AMF being transmitted to the SMF.

In addition, as an aspect of the present disclosure, a Target-Access and Mobility Management Function (T-AMF) for supporting a User Equipment (UE) handover in a wireless communication system may include a communication module for transmission and receiving a signal; and a processor for controlling the communication module, wherein the processor is configured to: receive, from a Source-AMF (S-AMF), a create UE context request message, wherein the create UE context request message includes a Packet Data Unit (PDU) session Identifier (ID) which is a target of handover and Single-Network Slice Selection Assistance Information (S-NSSAI) corresponding to each PDU session ID; determine whether the corresponding S-NSSAI is available in the T-AMF; and based on a result of the determination, transmit a PDU session update Session Management (SM) context request message to a Session Management Function (SMF) only for the PDU session ID corresponding to the S-NSSAI determined to be available among the PDU session IDs.

In addition, the processor may be configured to receive a PDU session update SM context response message in response to the PDU session update SM context request message, wherein the PDU session update SM context response message may include a PDU session ID of which handover is accepted by the SMF.

In addition, the processor may be configured to generate a non-accepted PDU session list including (i) a PDU session ID for which handover is not accepted by the T-AMF and/or the SMF, (ii) and a cause of non-acceptance for the PDU session ID for which handover is not accepted.

In addition, the PDU session ID for which handover is not accepted by the T-AMF may be a PDU session ID corresponding to the S-NSSAI determined to be non-available based on the result of the determination.

In addition, the cause of non-acceptance of handover may include a cause indicating that the handover is not accepted by the T-AMF because of the non-available S-NSSAI in the T-AMF.

In addition, the PDU session non-accepted by the T-AMF may be released after receiving a handover notification indicating handover is completed from the T-RAN.

Advantageous Effects

According to an embodiment of the present disclosure, in handover procedure, a User Equipment is available for filtering of a PDU session associated/connected/corresponding S-NSSAI in which a target core network control node that the User Equipment is intended to handover is unavailable to be supported, unnecessary signaling and resource allocation are reduced, and accordingly, there is an effect that performance of efficient handover procedure becomes available.

In addition, according to an embodiment of the present disclosure, there is an effect that handover procedure is more clearly defined.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating 5G system architecture using a reference point representation.

FIG. 2 is a diagram illustrating a radio protocol stack to which the present disclosure may be applied.

FIG. 3 is a diagram illustrating a handover preparation phase according to an embodiment of the present disclosure.

FIG. 4 is a diagram illustrating an execution phase in inter NG-RAN node N2 based handover according to an embodiment of the present disclosure.

FIG. 5 is a diagram illustrating AMF change procedure according to a movement of UE according to an embodiment of the present disclosure.

FIG. 6 is a flowchart illustrating handover preparation procedure according to an embodiment of the present disclosure.

FIG. 7 is a flowchart illustrating handover execution procedure according to an embodiment of the present disclosure.

FIGS. 8 to 10 are diagrams illustrating handover request procedure of T-AMF according to an embodiment of the present disclosure.

FIG. 11 is a flowchart illustrating a method for supporting UE handover of T-AMF according to an embodiment of the present disclosure.

FIG. 12 is a block diagram illustrating a T-AMF supporting UE handover according to an embodiment of the present disclosure.

FIG. 13 illustrates a block diagram of a communication apparatus according to an embodiment of the present disclosure.

FIG. 14 shows a block diagram of a communication apparatus according to an embodiment of the present disclosure.

MODE FOR INVENTION

In what follows, preferred embodiments according to the present disclosure will be described in detail with reference to appended drawings. The detailed descriptions provided below together with appended drawings are intended only to explain illustrative embodiments of the present disclosure, which should not be regarded as the sole embodiments of the present disclosure. The detailed descriptions below include specific information to provide complete understanding of the present disclosure. However, those skilled in the art will be able to comprehend that the present disclosure can be embodied without the specific information.

For some cases, to avoid obscuring the technical principles of the present disclosure, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present disclosure, and the specific terms can be used in different ways as long as it does not leave the technical scope of the present disclosure.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present disclosure can be supported by standard documents disclosed in at least one of wireless access systems including the IEEE 802, 3GPP, and 3GPP2 specifications. In other words, among the embodiments of the present disclosure, those steps or parts omitted for the purpose of clearly describing technical principles of the present disclosure can be supported by the documents above. Also, all of the terms disclosed in this document can be explained with reference to the standard documents.

To clarify the descriptions, this document is based on the 3GPP LTE/LTE-A, but the technical features of the present disclosure are not limited to the current descriptions.

Terms used in this document are defined as follows.

UMTS (Universal Mobile Telecommunications System): 3 Generation mobile communication technique based on Global System for Mobile Communication (GMS) developed by 3GPP.

EPS (Evolved Packet System): A network system including EPC (Evolved Packet Core) which is a packet switched core network based on IP (Internet Protocol) and an access network such as LTE, UTRAN, and the like.

NodeB: the base station of the UMTS network. NodeB is installed outside and provides coverage of a macro cell.

eNodeB: the base station of the EPS network. eNodeB is installed outside and provides coverage of a macro cell.

Home NodeB: It is installed indoors as a based station, and the coverage is a micro cell scale.

Home eNodeB: It is installed indoors as a base station of the EPS network, and the coverage is a micro cell scale.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, and so on) equipped with a communication function (e.g., communication with an MTC server through PLMN) operating through a mobile communication network and performing the MTC functions.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): an entity in 3GPP architecture for the service capability exposure that provides a means for safely exposing a service and a capability provided by 3GPP network interface.

MME (Mobility Management Entity): A network node in an EPS network, which performs mobility management and session management functions PDN-GW (Packet Data Network Gateway): A network node in the EPS network, which performs UE IP address allocation, packet screening and filtering, and charging data collection functions.

Serving GW (Serving Gateway): A network node in the EPS network, which performs functions such as mobility anchor, packet routing, idle mode packet buffering, and triggering paging for the ME of MME Policy and Charging Rule Function (PCRF): A node in the EPS network, which performs policy decision to dynamically apply differentiated QoS and billing policies for each service flow PDN (Packet Data Network): A network in which a server supporting a specific service (e.g., MMS server, WAP server, etc.) is located.

PDN connection: A connection from the UE to the PDN, that is, the association (connection) between the UE represented by the IP address and the PDN represented by the APN.

In what follows, the present disclosure will be described based on the terms defined above.

5G System Architecture to which the Present Disclosure May be Applied

A 5G system is a technology advanced from the 4th generation LTE mobile communication technology and a new radio access technology (RAT) through the evolution of the existing mobile communication network structure or a clean-state structure and an extended technology of long term evolution (LTE), and it supports extended LTE (eLTE), non-3GPP (e.g., WLAN) access and so on.

A 5G system is defined based on a service, and an interaction between network functions (NFs) within architecture for a 5G system may be expressed by two methods as follows.

Reference point representation (FIG. 1): indicates an interaction between NF services within NFs described by a point-to-point reference point (e.g., N11) between two NFs (e.g., AMF and SMF).

Service-based representation (FIG. 10): network functions (e.g., AMFs) within a control plane (CP) permit other authenticated network functions to access its own service. If this representation is necessary, it also includes a point-to-point reference point.

FIG. 1 is a diagram illustrating 5G system architecture using a reference point representation.

Referring to FIG. 1, the 5G system architecture may include various elements (i.e., a network function (NF)). This drawing illustrates an authentication server function (AUSF), a (core) access and mobility management function (AMF), a session management function (SMF), a policy control function (PCF), an application function (AF), united data management (UDM), a data network (DN), a user plane function (UPF), a (radio) access network ((R)AN) and a user equipment (UE) corresponding to some of the various elements.

Each of the NFs supports the following functions.

AUSF stores data for the authentication of a UE.

AMF provides a function for access of a UE unit and mobility management and may be basically connected to one AMF per one UE.

Specifically, the AMF supports functions, such as signaling between CN nodes for mobility between 3GPP access networks, the termination of a radio access network (RAN) CP interface (i.e., N2 interface), the termination (N1) of NAS signaling, NAS signaling security (NAS ciphering and integrity protection), AS security control, registration area management, connection management, idle mode UE reachability (including control and execution of paging retransmission), mobility management control (subscription and policy), intra-system mobility and inter-system mobility support, the support of network slicing, SMF selection, lawful interception (for an AMF event and an interface to an LI system), the provision of transfer of a session management (SM) message between a UE and an SMF, a transparent proxy for SM message routing, access authentication, access authorization including a roaming right check, the provision of transfer of an SMS message between a UE and an SMSF (SMS(Short Message Service) function), a security anchor function (SEA) and/or security context management (SCM).

Some or all of the functions of the AMF may be supported within a single instance of one AMF.

DN means an operator service, Internet access or a 3rd party service, for example. The DN transmits a downlink protocol data unit (PDU) to an UPF or receives a PDU, transmitted by a UE, from a UPF.

PCF provides a function for receiving information about a packet flow from an application server and determining a policy, such as mobility management and session management. Specifically, the PCF supports functions, such as the support of a unified policy framework for controlling a network behavior, the provision of a policy rule so that a CP function(s) (e.g., AMF or SMF) can execute a policy rule, and the implementation of a front end for accessing related subscription information in order to determine a policy within user data repository (UDR).

SMF provides a session management function and may be managed by a different SMF for each session if a UE has a plurality of sessions.

Specifically, the SMF supports functions, such as session management (e.g., session setup, modification and release including the maintenance of a tunnel between a UPF and an AN node), UE IP address allocation and management (optionally including authentication), the selection and control of the UP function, a traffic steering configuration for routing traffic from the UPF to a proper destination, the termination of an interface toward policy control functions, the execution of the control part of a policy and QoS, lawful interception (for an SM event and an interface to an LI system), the termination of the SM part of an NAS message, downlink data notification, the initiator of AN-specific SM information (transferred to an AN through N2 via the AMF), the determination of an SSC mode of a session, and a roaming function.

Some or all of the functions of the SMF may be supported within a single instance of one SMF.

UDM stores the subscription data of a user, policy data, etc. UDM includes two parts, that is, an application front end (FE) and user data repository (UDR).

The FE includes a UDM FE responsible for the processing of location management, subscription management and credential and a PCF responsible for policy control. The UDR stores data required for functions provided by the UDM-FE and a policy profile required by the PCF. Data stored within the UDR includes user subscription data, including a subscription ID, security credential, access and mobility-related subscription data and session-related subscription data, and policy data. The UDM-FE supports functions, such as access to subscription information stored in the UDR, authentication credential processing, user identification handling, access authentication, registration/mobility management, subscription management, and SMS management.

UPF transfers a downlink PDU, received from a DN, to a UE via an (R)AN and transfers an uplink PDU, received from a UE, to a DN via an (R)AN.

Specifically, the UPF supports functions, such as an anchor point for intra/inter RAT mobility, the external PDU session point of interconnection to a data network, packet routing and forwarding, a user plane part for the execution of packet inspection and a policy rule, lawful interception, a traffic usage report, an uplink classifier for supporting the routing of traffic flow of a data network, a branching point for supporting a multi-home PDU session, QoS handling (e.g., the execution of packet filtering, gating and an uplink/downlink rate) for a user plane, uplink traffic verification (SDF mapping between a service data flow (SDF) and a QoS flow), transport level packet marking within the uplink and downlink, downlink packet buffering, and a downlink data notification triggering function. Some or all of the functions of the UPF may be supported within a single instance of one UPF.

AF interoperates with a 3GPP core network in order to provide services (e.g., support functions, such as an application influence on traffic routing, network capability exposure access, an interaction with a policy framework for policy control).

(R)AN collectively refers to a new radio access network supporting all of evolved E-UTRA (E-UTRA) and new radio (NR) access technologies (e.g., gNB), that is, an advanced version of the 4G radio access technology.

The network node in charge of transmission/reception of wireless signals with the UE is the gNB, and plays the same role as the eNB.

The gNB supports functions for radio resource management (i.e., radio bearer control and radio admission control), connection mobility control, the dynamic allocation (i.e., scheduling) of resources to a UE in the uplink/downlink, Internet protocol (IP) header compression, the encryption and integrity protection of a user data stream, the selection of an AMF upon attachment of a UE if routing to the AMF has not been determined based on information provided to the UE, the selection of an AMF upon attachment of a UE, user plane data routing to an UPF(s), control plane information routing to an AMF, connection setup and release, the scheduling and transmission of a paging message (generated from an AMF), the scheduling and transmission of system broadcast information (generated from an AMF or operation and maintenance (O&M)), a measurement and measurement report configuration for mobility and scheduling, transport level packet marking in the uplink, session management, the support of network slicing, QoS flow management and mapping to a data radio bearer, the support of a UE that is an inactive mode, the distribution function of an NAS message, an NAS node selection function, radio access network sharing, dual connectivity, and tight interworking between an NR and an E-UTRA.

UE means a user device. A user apparatus may be called a term, such as a terminal, a mobile equipment (ME) or a mobile station (MS). Furthermore, the user apparatus may be a portable device, such as a notebook, a mobile phone, a personal digital assistant (PDA), a smartphone or a multimedia device, or may be a device that cannot be carried, such as a personal computer (PC) or a vehicle-mounted device.

In the drawings, for the clarity of description, an unstructured data storage network function (UDSF), a structured data storage network function (SDSF), a network exposure function (NEF) and an NF repository function (NRF) are not shown, but all of the NFs shown in this drawing may perform mutual operations along with the UDSF, NEF and NRF, if necessary.

NEF provides means for safely exposing services and capabilities provided by 3GPP network functions, for example, for a 3rd party, internal exposure/re-exposure, an application function, and edge computing. The NEF receives information from other network function(s) (based on the exposed capability(s) of other network function(s)). The NEF may store information received as structured data using a standardized interface as a data storage network function. The stored information is re-exposed to other network function(s) and application function(s) by the NEF and may be used for other purposes, such as analysis.

NRF supports a service discovery function. It receives an NF discovery request from an NF instance and provides information of a discovered NF instance to an NF instance. Furthermore, it maintains available NF instances and services supported by the available NF instances.

SDSF is an optional function for supporting a function of storing and retrieving information as structured data by any NEF.

UDSF is an optional function for supporting a function of storing and retrieving information as unstructured data by any NF.

In the 5G system, a node which is responsible for wireless transmission/reception with the UE is gNB and plays the same role as the eNB in the EPS. When the UE is simultaneously connected to the 3GPP connection and the non-3GPP connection, the UE receives a service through one AMF as illustrated in FIG. 1. In FIG. 1, it is illustrated that a connection is made by the non-3GPP connection and a connection is made by the 3GPP connection are connected to one same UPF, but the connection is not particularly required and may be connected by a plurality of different UPFs.

However, when the UE selects N3IWK (also referred to as non-3GPP interworking function (N3IWF)) in the HPLMN in the roaming scenario and is connected to the non-3GPP connection, the AMF that manages the 3GPP connection may be located in the VPLMN and the AMF that manages the non-3GPP connection may be located in the HPLMN.

The non-3GPP access network is connected to the 5G core network via N3IWK/N3IWF. The N3IWK/N3IWF interfaces the 5G core network control plane function and user plane function via the N2 and N3 interfaces, respectively.

A representative example of the non-3GPP connection mentioned in the present specification may be a WLAN connection.

Meanwhile, this drawing illustrates a reference model if a UE accesses one DN using one PDU session, for convenience of description, but the present disclosure is not limited thereto.

A UE may access two (i.e., local and central) data networks at the same time using multiple PDU sessions. In this case, for different PDU sessions, two SMFs may be selected. In this case, each SMF may have the ability to control both a local UPF and central UPF within a PDU session, which can be independently activated per PDU.

Furthermore, a UE may access two (i.e., local and central) data networks provided within one PDU session at the same time.

In the 3GPP system, a conceptual link that connects NFs within the 5G system is defined as a reference point. The following illustrates reference points included in 5G system architecture represented in this drawing.

N1: a reference point between a UE and an AMF
N2: a reference point between an (R)AN and an AMF
N3: a reference point between an (R)AN and a UPF
N4: a reference point between an SMF and a UPF
N5: a reference point between a PCF and an AF
N6: a reference point between a UPF and a data network
N7: a reference point between an SMF and a PCF
N24: a reference point between a PCF within a visited network and a PCF within a home network
N8: a reference point between a UDM and an AMF
N9: a reference point between two core UPFs
N10: a reference point between a UDM and an SMF
N11: a reference point between an AMF and an SMF
N12: a reference point between an AMF and an AUSF
N13: a reference point between a UDM and an authentication server function (AUSF)
N14: a reference point between two AMFs
N15: a reference point between a PCF and an AMF in the case of a non-roaming scenario and a reference point between a PCF within a visited network and an AMF in the case of a roaming scenario
N16: a reference point between two SMFs (in the case of a roaming scenario, a reference point between an SMF within a visited network and an SMF within a home network)
N17: a reference point between an AMF and an EIR
N18: a reference point between any NF and an UDSF
N19: a reference point between an NEF and an SDSF Radio Protocol Architecture FIG. 2 is a diagram illustrating a radio protocol stack to which the present disclosure may be applied. Specifically, FIG. 2(a) illustrates a radio interface user plane protocol stack between a UE and a gNB, and FIG. 2(b) illustrates a radio interface control plane protocol stack between the UE and the gNB.

A control plane means a passage through which control messages are transmitted in order for a UE and a network to manage a call. A user plane means a passage through which data generated in an application layer, for example, voice data or Internet packet data is transmitted.

Referring to FIG. 2(a), the user plane protocol stack may be divided into a first layer (Layer 1) (i.e., a physical layer (PHY) layer) and a second layer (Layer 2).

Referring to FIG. 2(b), the control plane protocol stack may be divided into a first layer (i.e., a PHY layer), a second layer, a third layer (i.e., a radio resource control (RRC) layer) and a non-access stratum (NAS) layer.

The second layer is divided into a medium access control (MAC) sublayer, a radio link control (RLC) sublayer, a packet data convergence protocol (PDC) sublayer, and a service data adaptation protocol (SDAP) sublayer (in the case of a user plane).

Radio bearers are classified into two groups: a data radio bearer (DRB) for user plane data and a signaling radio bearer (SRB) for control plane data Hereinafter, the layers of the control plane and user plane of the radio protocol are described.

1) The PHY layer, that is, the first layer, provides information transfer service to a higher layer using a physical channel. The PHY layer is connected to the MAC sublayer located in a high level through a transport channel. Data is transmitted between the MAC sublayer and the PHY layer through a transport channel. The transport channel is classified depending on how data is transmitted according to which characteristics through a radio interface. Furthermore, data is transmitted between different physical layers, that is, between the PHY layer of a transmission stage and the PHY layer of a reception stage through a physical channel.

2) The MAC sublayer performs mapping between a logical channel and a transport channel; the multiplexing/demultiplexing of an MAC service data unit (SDU) belonging to one logical channel or different logical channels to/from a transport block (TB) transferred to/from the PHY layer through a transport channel; a scheduling information report; error correction through a hybrid automatic repeat request (HARQ); priority handling between UEs using dynamic scheduling; priority handling between the logical channels of one UE using logical channel priority; and padding.

Different types of data transfer service provided by the MAC sublayer. Each logical channel type defines that information of which type is transferred.

Logical channels are classified into two groups: a control channel and a traffic channel.

i) The control channel is used to transfer only control plane information and is as follows.

Broadcast control channel (BCCH): a downlink channel system for broadcasting control information.

Paging control channel (PCCH): a downlink channel transferring paging information and system information change notification.

Common control channel (CCCH): a channel for transmitting control information between a UE and a network. This channel is used for UEs not having an RRC connection with a network.

Dedicated control channel (DCCH): a point-to-point bidirectional channel for transmitting dedicated control information between a UE and a network. It is used by a UE having an RRC connection.

ii) The traffic channel is used to use only user plane information:

Dedicated traffic channel (DTCH): a point-to-point channel for transferring user information and dedicated to a single UE. The DTCH may be present in both the uplink and downlink.

In the downlink, a connection between a logical channel and a transport channel is as follows.

A BCCH may be mapped to a BCH. A BCCH may be mapped to a DL-SCH. A PCCH may be mapped to a PCH. A CCCH may be mapped to a DL-SCH. A DCCH may be mapped to a DL-SCH. A DTCH may be mapped to a DL-SCH.

In the uplink, a connection between a logical channel and a transport channel is as follows. A CCCH may be mapped to an UL-SCH. A DCCH may be mapped to an UL-SCH. A DTCH may be mapped to an UL-SCH.

3) The RLC sublayer supports three transport modes: a transparent mode (TM), an unacknowledged mode (UM) and acknowledged mode (AM).

An RLC configuration may be applied to each logical channel. In the case of an SRB, the TM or AM mode is used. In contrast, in the case of a DRB, the UM or AM mode is used.

The RLC sublayer performs the transfer a higher layer PDU; independent sequence numbering with a PDCP; error correction through an automatic repeat request (ARW); segmentation and re-segmentation; the reassembly of an SDU; RLC SDU discard; and RLC re-establishment.

4) The PDCP sublayer for a user plane performs sequence numbering; header compression and compression-decompression (corresponding to only robust header compression (RoHC)); user data transfer; reordering and duplicate detection (if there is transfer to a layer higher than the PDCP); PDCP PDU routing (in the case of a split bearer); the retransmission of a PDCP SDU; ciphering and deciphering; PDCP SDU discard; PDCP re-establishment and data recovery for RLC AM; and the duplication of a PDCP PDU.

The PDCP sublayer a control plane additionally performs sequence numbering; ciphering, deciphering and integrity protection; control plane data transfer; duplication detection; the duplication of a PDCP PDU.

When duplication for a radio bearer is configured by RRC, an additional RLC entity and an additional logical channel are added to a radio bearer in order to control a duplicated PDCP PDU(s). In the PDCP, duplication includes transmitting the same PDCP PDU(s) twice. The first one is transferred to the original RLC entity, and the second one is transferred to an additional RLC entity. In this case, the duplication corresponding to the original PDCP PDU is not transmitted to the same transport block. Different two logical channels may belong to the same MAC entity (in the case of a CA) or to different MAC entities (in the case of DC). In the former case, a logical channel mapping restriction is used to guarantee that a duplication corresponding to the original PDCP PDU is not transferred to the same transport block.

5) The SDAP sublayer performs i) mapping between a QoS flow and a data radio bearer and ii) QoS flow ID marking within a downlink and uplink packet.

One protocol entity of an SDAP is configured for each PDU session, but exceptionally in the case of dual connectivity (DC), two SDAP entities may be configured.

6) The RRC sublayer performs the broadcasting of system information related to an access stratum (AS) and a non-access stratum (NAS); paging initiated by 5GC or an NG-RAN; the establishment, maintenance and release (additionally including the modification and release of a carrier aggregation and additionally including the modification and release of dual connectivity between an E-UTRAN and an NR or within an NR) of an RRC connection between a UE and an NG-RAN; a security function including key management; the establishment, configuration, maintenance and release of an SRB(s) and a DRB(s); handover and context transfer; control of UE cell selection, re-release and cell selection/reselection; a mobility function including mobility between RATs; a QoS management function, a UE measurement report and report control; the detection of a radio link failure and recovery from a radio link failure; and the transfer of an NAS message from an NAS to a UE and the transfer of an NAS message from a UE to an NAS.

Handover Procedure

In the case that for a UE in CM-CONNECTED state, a wireless node (RAN node of eNB, gNB, etc.) currently receiving a service, or a core network node (AMF) or a user plane node (UPF) connected thereto needs to be changed owing to mobility, the RAN node that serves the UE performs handover process/procedure. The handover is divided into two types largely: Xn based handover for which RAN nodes exchanges signals and contents with each other through Xn interface between RAN nodes and N2 based handover in which N2 (or NG-C) signaling is required between a RAN node and a core network. The N2 based handover may be performed as below.

FIG. 3 is a diagram illustrating a handover preparation phase according to an embodiment of the present disclosure. Particularly, FIG. 3 shows a preparation phase in the N2 based handover of an inter NG-RAN node.

1. S-RAN to S-AMF: Handover Required (Target ID, Source to Target transparent container, SM N2 info list, PDU Session IDs).

Target ID Includes the Selected PLMN ID.

Source to Target transparent container includes RAN information created by S-RAN to be used by T-RAN and is transparent to 5GC.

All PDU Sessions handled by S-RAN (i.e., all existing PDU Sessions with active UP connections) is included in the Handover Required message, indicating which of those PDU Session is requested by S-RAN to handover. The SM N2 information includes Direct Forwarding Path Availability, and which QoS Flow is subject to data forwarding.

Direct Forwarding Path Availability indicates whether direct forwarding is available from the S-RAN to the T-RAN. This indication from S-RAN includes the presence of IP connectivity and security association(s) between the S-RAN and the T-RAN.

2. T-AMF Selection: When the Source (S)-AMF is unavailable to provide the UE service anymore, the S-AMF selects the T-AMF as described in clause 6.4.5 on "AMF Selection Function" in TS 23.501 [2].

[Conditional] S-AMF to T-AMF: Namf_Communication_CreateUEContext Request (N2 Information (Target ID, Source to Target transparent container, SM N2 information list, Service area restriction), UE context information containing SUPI and/or the list of PDU Session IDs along with the corresponding SMF information).

The S-AMF initiates Handover resource allocation procedure by invoking the Namf_Communication_CreateUEContext service operation towards the T-AMF.

When the S-AMF is still unavailable to serve the UE, this step and step 12 are not needed.

In the case that Service area restrictions are available in the S-AMF, they may be forwarded to the T-AMF as described in clause 5.3.4.1.2 in TS 23.501.

4. [Conditional] T-AMF to SMF: Nsmf_PDUSession_UpdateSMContext (PDU Session ID, Target ID, T-AMF ID).

For each PDU Session indicated by S-RAN as an N2 Handover candidate, the AMF invokes the Nsmf_PDUSession_UpdateSMContext Request per PDU Session to the associated SMF.

PDU Session ID indicates a PDU Session candidate for N2 Handover. Target ID as the UE location information.

When the (T-)AMF detects that the UE moves into a non-allowed area based on Service area restrictions, the (T-)AMF notifies each SMF corresponding to the list of PDU Sessions received from the Handover Required message that the UE is only reachable for regulatory prioritized services.

5. [Conditional] Based on the Target ID, the SMF checks whether N2 Handover for the indicated PDU Session can be accepted. The SMF checks also the UPF Selection Criteria according to clause 6.3.3 of TS 23.501 [2]. In the case that the UE has moved out of the service area of the UPF connecting to RAN, the SMF selects a new intermediate UPF. In the case that the PDU Session corresponds to a LADN and the UE is outside the area of availability of the LADN, then the SMF moves to step 6c.

6a. [Conditional] SMF to T-UPF (intermediate): N4 Session Establishment Request.

In the case that the SMF selects a new intermediate UPF (i.e., the target UPF (T-UPF)) for the PDU Session and in the case that CN Tunnel Information is allocated by the T-UPF, an N4 Session Establishment Request message is sent to the T-UPF, and it is provided Packet detection, enforcement and reporting rules installed on the T-UPF. The PDU Session Anchor Tunnel Information for this PDU Session is also provided to the T-UPF.

6b. T-UPF (intermediate) to SMF: N4 Session Establishment Response.

The T-UPF sends an N4 Session Establishment Response message to the SMF with DL CN Tunnel Information and UL CN Tunnel Information (i.e., N3 tunnel information). The SMF starts a timer to release the resource of S-UPF to be used in step 12a of the Execution Phase.

When steps 6a and 6b are performed for a PDU Session, steps 6c and 6d are skipped.

6c, d. [Conditional] SMF to S-UPF: N4 Session Modification Request/Response.

In the case that the PDU Session corresponds to a LADN and the UE is outside the area of availability of the LADN, the SMF updates the N4 session of the UPF(s) corresponding to the PDU Session to deactivate the corresponding UP connection. The SMF may notify the UPF that originated the Data Notification to discard downlink data for the PDU Sessions and to not provide further Data Notification messages.

7. SMF to T-AMF: Nsmf_PDUSession_UpdateSMContext Response (PDU Session ID, SM N2 Information).

When N2 handover for the PDU Session is accepted, the SMF includes in the Nsmf_PDUSession_UpdateSMContext response the SM N2 Information containing the N3 UP address and the UL CN Tunnel ID of the UPF and the QoS parameters indicating that the SM N2 Information is for the Target NG-RAN.

In the case that N2 handover for the PDU Session is not accepted as described in step 4, the SMF does not include an SM N2 Information regarding the PDU Session to avoid establishment of radio resources at the target RAN. In the case that the SMF notifies that the UE is only reachable for regulatory prioritized services, the SMF does not include any SM N2 information regarding the PDU Session for non-regulatory prioritized services to avoid establishment of radio resources at the target RAN.

The SMF sends a Nsmf_PDUSession_UpdateSMContext response without including the CN Tunnel Info to the AMF for the PDU Session which is to be released, and then release the PDU Session in a separate procedure as defined in clause 4.3.4.

8. The AMF supervises the Nsmf_PDUSession_UpdateSMContext Response messages from the involved SMFs. The lowest value of the Maximum delay indication for the PDU Sessions that are candidates for handover provides the maximum time when AMF may wait for Nsmf_PDUSession_UpdateSMContext Response messages before continuing with the N2 Handover procedure. When the maximum wait time is expired or when all Nsmf_PDUSession_UpdateSMContext Response messages are received, the AMF continues with the N2 Handover procedure (Handover Request message in step 9).

The delay value for each PDU Session is locally configured in the AMF and different according to an implementation.

9. T-AMF to T-RAN: Handover Request (Source to Target transparent container, MM N2 Information, SM N2 Information list, Handover Restriction List).

T-AMF determines T-RAN based on Target ID. The T-AMF may allocate a 5G-GUTI valid for the UE in the AMF and target TAI.

Source to Target transparent container is forwarded as received from S-RAN. MM N2 Information includes, for example, security information and Handover Restriction List if available in the T-AMF.

SM N2 Information list includes SM N2. The SM N2 Information list may include SM N2 Information received from SMFs for the T-RAN in the Nsmf_PDUSession_UpdateSMContext Response messages received within allowed maximum delay supervised by the T-AMF mentioned in step 8. The SM N2 Information indicates which QoS Flows are subject to data forwarding.

Handover Restriction List is sent if available in the Target AMF.

10. T-RAN to T-AMF: Handover Request Acknowledge (Target to Source transparent container, SM N2 response list, PDU Sessions failed to be setup list, T-RAN SM N3 forwarding Information list).

Target to Source transparent container includes a UE container with an access stratum part and a NAS part. The UE container is sent transparently via T-AMF, S-AMF and S-RAN to the UE.

The information provided to the S-RAN also contains a list of PDU Session IDs indicating PDU Sessions failed to be setup and reason for failure (SMF decision, SMF response too late, or T-RAN decision).

The SM N2 response list includes, per each received SM N2 Information and by SMF accepted PDU Session for N2 Handover, a PDU Session ID and an SM N2 response indicating the PDU Session ID and whether the T-RAN accepted the N2 Handover request for the PDU Session. For each PDU Session accepted by the T-RAN for N2 Handover, the SM N2 response includes N3 UP address and Tunnel ID of the T-RAN.

The T-RAN SM N3 forwarding information list includes, per each PDU Session accepted by the T-RAN and has at least one QoS Flow subject for data forwarding, N3 UP address and Tunnel ID of T-RAN for receiving forwarded data if necessary.

11. [Conditional] T-AMF to SMF: Nsmf_PDUSession_UpdateSMContext Request (PDU Session ID, Cause).

In the case that an Nsmf_PDUSession_UpdateSMContext Response message arrives too late (refer to step 8), or the PDU Session with SMF involvement is not accepted by the T-RAN, this message is sent to the corresponding SMF allowing the SMF to deallocate a possibly allocated N3 UP address and Tunnel ID of the selected UPF. A PDU Session handled by that SMF is considered deactivated and handover attempt is terminated for that PDU Session.

12a. AMF to SMF: Nsmf_PDUSession_UpdateSMContext Request (PDU Session ID, SM N2 response, T-RAN SM N3 forwarding Information list).

For each SM N2 response received from the T-RAN (included in SM N2 response list), AMF sends the received SM N2 response to the SMF indicated by the respective PDU Session ID.

In the case that a new T-UPF is not selected, the SMF stores the N3 tunnel information of the T-RAN from the SM N2 response when N2 handover is accepted by the T-RAN.

12b. [Conditional] SMF to T-UPF: N4 Session Modification Request (T-RAN SM N3 forwarding Information list, indication to allocate a DL forwarding tunnel for indirect forwarding)

In the case that the SMF selected a T-UPF in step 6a, the SMF updates the T-UPF by providing the T-RAN SM N3 forwarding information list by sending a N4 Session Modification Request to the T-UPF.

In the case that indirect forwarding applies based on indication from NG-RAN and the UPF is relocated and in the case that the SMF decides to configure the indirect forwarding tunnel on the same T-UPF, the SMF also requests in the N4 Session Modification Request message to the T-UPF to allocate a DL forwarding tunnel for indirect forwarding.

The indirect forwarding may be performed via a UPF which is different from the T-UPF, and in this case the SMF selects a T-UPF for indirect forwarding.

12c. [Conditional] T-UPF to SMF: N4 Session Modification Response (T-UPF SM N3 forwarding Information list).

The T-UPF allocates tunnel information and returns an N4 Session Modification Response message to the SMF.

The T-UPF SM N3 forwarding information list includes T-UPF N3 address, T-UPF N3 Tunnel identifiers for forwarding data 12d. [Conditional] SMF to S-UPF: N4 Session Modification Request (T-RAN SM N3 forwarding Information list or T-UPF SM N3 forwarding Information list, indication to allocate a DL forwarding tunnel for indirect forwarding).

When the UPF is relocated, this message includes the T-UPF SM N3 forwarding information list. In the case that the UPF is not relocated, this message includes the T-RAN SM N3 forwarding information list.

In the case that indirect forwarding applies based on indication from NG-RAN, the SMF indicates in the N4 Session Modification Request message to the S-UPF to allocate a DL forwarding tunnel for indirect forwarding.

The indirect forwarding may be performed via a UPF which is different from the S-UPF.

12e. [Conditional] S-UPF to SMF: N4 Session Modification Response (S-UPF SM N3 forwarding Information list).

The S-UPF allocates tunnel information and returns an N4 Session establishment Response message to the SMF.

The S-UPF SM N3 forwarding Information list includes S-UPF N3 address, S-UPF N3 Tunnel identifiers for forwarding data for both UL and DL.

12f. SMF to T-AMF: Nsmf_PDUSession_UpdateSM-Context Response (N2 SM Information).

The SMF transmits a Nsmf_PDUSession_UpdateSM-Context Response message per PDU Session to T-AMF.

The SMF creates an N2 SM information containing the DL forwarding tunnel information to be sent to the S-RAN by the AMF. The SMF includes this information in the Nsmf_PDUSession_UpdateSMContext response. The DL forwarding tunnel information may be one of the following information:

In the case that direct forwarding applies, then the SMF includes the T-RAN N3 forwarding information the SMF received in step 12a.

In the indirect forwarding tunnel is setup in step 12b or 12d, then the SMF includes the T-UPF or S-UPF DL forwarding information containing the N3 UP address and the DL Tunnel ID of the UPF.

The SMF starts an indirect data forwarding timer, to be used to release the resource of indirect data forwarding tunnel.

13. [Conditional] T-AMF to S-AMF: Namf_Communication_CreateUEContext Response (N2 information necessary for S-AMF to send Handover Command to S-RAN including Target to Source transparent container, N2 SM information (PDU Sessions failed to be setup list, and the N3 DL forwarding Information)).

AMF supervises the Nsmf_PDUSession_UpdateSMContext Response message from the involved SMFs. At expiry of the maximum wait time or when all Nsmf_PDUSession_UpdateSMContext Response messages are received, the T-AMF sends the Namf_Communication_CreateUEContext Response to the S-AMF.

The Target to Source transport container is received from the T-RAN. The N2 SM Information is received from the SMF in step 12f.

FIG. 4 is a diagram illustrating an execution phase in inter NG-RAN node N2 based handover according to an embodiment of the present disclosure. In the drawing, it is not shown providing AMF with the UDM for brevity.

1. S-AMF to S-RAN: Handover Command (Target to Source transparent container, PDU Sessions failed to be setup list, SM forwarding info list).

Target to Source transparent container is forwarded as received from S-AMF.

The SM forwarding information list includes T-RAN SM N3 forwarding information list for direct forwarding or S-UPF SM N3 forwarding information list for indirect data forwarding.

The S-RAN uses the PDU Sessions failed to be setup list and the indicated reason for failure to decide whether to proceed with the N2 Handover procedure.

2. S-RAN to UE: Handover Command (UE container).

UE container is a UE part of the Target to Source transparent container which is sent transparently from the T-RAN via the AMF to the S-RAN and is provided to the UE by the S-RAN.

3. Uplink packet is sent from the T-RAN to the T-UPF and the UPF (PSA). Downlink packet is sent from the UPF (PSA) to the S-RAN via the S-UPF. The S-RAN needs to start forwarding of downlink data from the S-RAN towards the T-RAN for QoS Flows subject to data forwarding. This may be either direct (step 3a) or indirect forwarding (step 3b).

4. UE to T-RAN: Handover Confirm.

After the UE has successfully synchronized to the target cell, it sends a Handover Confirm message to the T-RAN. Handover is by this message considered as successful by the UE.

5. T-RAN to T-AMF: Handover Notify.

Handover is by this message considered as successful in T-RAN.

6a. [Conditional]T-AMF to S-AMF: Namf_Communication_N2InfoNotify.

The T-AMF notifies to the S-AMF about the N2 handover notify received from the T-RAN by invoking the Namf_Communication_N2InfoNotify.

A timer in S-AMF is started to supervise when resources in S-RAN shall be release.

6b. [Conditional]S-AMF to T-AMF: Namf_Communication_N2InfoNotify ACK.

The S-AMF acknowledges by sending the Namf_Communication_N2InfoNotify ACK to the T-AMF.

7. T-AMF to SMF: Nsmf_PDUSession_UpdateSMContext Request (Handover Complete indication for PDU Session ID).

Handover Complete is sent per each PDU Session to the corresponding SMF to indicate the success of the N2 Handover.

The T-AMF also registers itself as the serving AMF with the UDM by using Nudm_UECM_Registration.

8a. [Conditional] SMF to T-UPF (intermediate): N4 Session Modification Request.

In the case that new T-UPF is inserted or an existing intermediate S-UPF is relocated, the SMF needs to send N4 Session Modification Request indicating DL AN Tunnel Information of T-RAN to the T-UPF.

8b. [Conditional] T-UPF to SMF: N4 Session Modification Response.

The T-UPF acknowledges by sending N4 Session Modification Response message to the SMF.

9a. [Conditional] SMF to S-UPF (intermediate): N4 Session Modification Request.

In the case that the UPF is not relocated, the SMF needs to send N4 Session Modification Request indicating DL AN Tunnel Information of T-RAN to the S-UPF.

9b. [Conditional] S-UPF to SMF: N4 Session Modification Response.

The S-UPF acknowledges by sending N4 Session Modification Response message to SMF.

10a. [Conditional] SMF to UPF (PSA): N4 Session Modification Request.

For non-roaming or local breakout roaming scenario, the SMF sends N4 Session Modification Request message to PDU Session Anchor UPF, UPF (PSA), and provides N3 AN Tunnel Information of T-RAN or the DL CN Tunnel Information of T-UPF. A new T-UPF is inserted or an existing intermediate S-UPF is relocated. In the case that the existing intermediate S-UPF terminating to N9 toward the H-UPF (PDU Session Anchor) is relocated for the home routed roaming scenario, the V-SMF invokes an Nsmf_PDUSession_Update Request service operation toward the H-SMF.

In the case that the T-UPF is not inserted or an existing intermediate S-UPF is not relocated, steps 10a and step 10b are skipped.

10b. [Conditional] UPF (PSA) to SMF: N4 Session Modification Response.

The UPF (PSA) sends N4 Session Modification Response message to SMF. In order to assist the reordering function in the T-RAN, the UPF (PSA) sends one or more "end marker" packets to each QoS Flow that require reordering on the previous path immediately after switching the path. The source UPF transmits the "end marker" packets to the source RAN. At this point, in the case that a new T-UPF is inserted or an existing intermediate S-UPF is relocated, the UPF (PSA) starts sending downlink packets to the T-RAN, via T-UPF. In case of home routed roaming scenario, the H-SMF responds with the Nsmf_PDUSession_Update Response service operation once the H-UPF (PDU Session Anchor) is updated with the UL tunnel information of the T-UPF.

When there are multiple UPFs (PSAs), step 10a and step 10b are performed for each UPF (PSA).

11. SMF to T-AMF: Nsmf_PDUSession_UpdateSMContext Response (PDU Session ID).

The SMF confirms reception of Handover Complete.

12. The UE may initiate mobility Registration procedure.

The target AMF knows that it is a Handover procedure and therefore the target AMF performs only a subset of the Registration procedure, specifically steps 5, 6 and 10 for the context transfer between the source AMF and the target AMF are skipped.

13a. [Conditional] SMF to S-UPF (intermediate): N4 Session Release Request.

In the case that there is a source intermediate UPF, the SMF initiates resource release after the timer in step 7 or an indirect data forwarding timer expires by transmitting an N4 Session Release Request (Release Cause) to the source UPF. This message is also used to release the indirect data forwarding resource in the S-UPF.

13b. S-UPF to SMF: N4 Session Release Response.

The S-UPF acknowledges with an N4 Session Release Response message to confirm the release of resources.

In case of indirect data forwarding, the resource of indirect data forwarding is also released.

14a. AMF to S-RAN: UE Context Release Command ( ).

After the timer in step 6a expires, the AMF sends UE Context Release Command.

14b. S-RAN to AMF: UE Context Release Complete ( ).

The source RAN releases its resources related to the UE and responds with a UE Context Release Complete 0 message.

15a. [Conditional] SMF to T-UPF: N4 Session Modification Request.

In the case that indirect forwarding applies and the UPF is relocated, after timer of indirect data forwarding expires, the SMF sends N4 Session Modification Request to the T-UPF to release the indirect data forwarding resource.

15b. [Conditional] T-UPF to SMF: N4 Session Modification Response.

The T-UPF acknowledges with an N4 Session Modification Response message to confirm the release of indirect data forwarding resources.

Handover Procedure Considering Network Slicing and PDU Session

FIG. 5 is a diagram illustrating AMF change procedure according to a movement of UE according to an embodiment of the present disclosure.

As shown in FIG. 5, the AMF needs to be changed as a UE moves. In this case, in the case that the UE is in CM-CONNECTED state and is transmitting/receiving data, the UE may handover the transmitting/receiving data from previous/source/old AMF (hereinafter, referred to as 'source AMF') to a next/target/new AMF (hereinafter, referred to as 'target AMF') seamlessly through N2 based handover. In this case, the UE associated/connected to the source AMF may establish a PDU session through a specific slice (e.g., Single-Network Slice Selection Assistance Information (S-NSSAI) #1) and handover during receiving service. In the case that the target AMF does not support the specific slice (S-NSSAI #1), the UE may receive service of the specific slice (S-NSSAI #1) through a new AMF, and the PDU session connected through the specific slice (S-NSSAI #1) cannot be operated properly anymore. However, in the current handover procedure, it has not been clearly defined how to deal with it.

During the handover procedure, unless the unavailable PDU session according to such a slice support failure is not separately processed, a network performs signaling and resource allocation to handover even for the PDU session unusable in a new AMF. Since the resource generated as such should be released again eventually in the later registration update through the new AMF, there is a problem that unnecessary signaling and resource waste are occurred.

In addition, according to the current standard, an AMF or 'slice' supportable in the service area of the AMF may be determined by the AMF, but it is determined by an SMF whether a 'PDU session' that a source RAN/AMF moves to a target RAN/AMF in handover procedure is received in a core network. For example, there may be a case that, following handover, a LADN PDU session is intended to move to a target RAN/AMF but the new area to which the UE moves is out of the LADN service area. In this case, the SMF decides not to allow the LADN PDU session finally, and instead of sending a handover request to the target RAN, deactivates UP connection of the corresponding LADN PDU session in UPF. However, even in this case, since the SMF is unable to know the slice information such as a slice supported by the target AM, the SMF is unable to determine handover accept/reject of the PDU session based on the slice information. In addition, in order for the AMF to determine whether handover of the PDU session is available, the AMF needs to know a slice through which the PDU session is generated, but it has been defined that the current AMF stores minimum information for the PDU session generated by the UE. Therefore, since the AMF does not know the information for controlling a session for each slice, it is impossible to control/determine whether handover for each PDU session is available. On the contrary, since the SMF knows the PDU information but does not know information on whether a slice is allowed, a problem occurs that the control/determination is impossible.

In summary, handover of a PDU session may be performed only in the case that the handover is supportable by both of an SMF and a target AMF. However, the SMF knows information on whether handover for each PDU session is available but does not know whether a slice of the target AMF for the corresponding PDU session is supported. And the target AMF knows its own supportable slice but does not know a slice through which the handover requested PDU session is generated. As a result, there is a problem that the SMF and the target AMF are hard to know accurately whether handover of the handover requested PDU session is available. Accordingly, the present disclosure proposes a method for solving such a problem as below.

Hereinafter, invention proposals 1 and 2 may be applied to the handover preparation procedure described in FIG. 3 above, and invention proposal 3 may be applied to the handover execution step described in FIG. 4 above. Accordingly, although it is not described repeatedly, the embodiments described herein may be identically/similarly applied to the description/embodiments of FIG. 3 and FIG. 4 described above.

Invention proposal 1. Providing S-NSSAI information per PDU Session

As mentioned above, in order to control/determine whether a slice that has been used in a source RAN/AMF is also usable in a target RAN/AMF in handover procedure, the AMF is required to know slice information (e.g., S-NSSAI) corresponding/associated per PDU session.

Invention proposal 1-1. Source RAN provides S-NSSAI.

Basically, when a source RAN (S-RAN) starts handover procedure through a measurement report, the S-RAN forwards PDU sessions that are in activated states currently to a source AMF (S-AMF) through a Handover Request message. In this case, the S-RAN may inform S-NSSAI associated with each PDU session (ID/information) with the PDU session (ID/information) to the S-AMF, and the S-AMF may forward it to a target AMF (T-AMF). The T-AMF may distinguish/determine the PDU session served through the slice (S-NSSAI) which is not supported by the T-AMF among the PDU sessions for which handover are requested in the S-AMF based on the forwarded information. In this case, when it is requested whether handover is available for the PDU session to each SMF, the T-AMF may not request for the PDU session belonged to/associated with/corresponding to the slice that the T-AMF itself is unable to support.

Invention proposal 1-2. SMF provides S-NSSAI.

In the case that RAN forwards only the PDU session ID without specific information, first, the T-AMF requests Nsmf_PDUSession_UpdateSMContext service to each SMF to determine whether handover is available for the PDU sessions requested by RAN. After the SMF checks whether the SMF may accept N2 handover for the requested PDU session, the SMF forwards information to be forwarded to RAN (e.g., N3 UL Tunnel Endpoint ID (TEID), N3 UPF address, QoS parameter, etc.) with being included in N2 SM information. In this case, the SMF may include slice information (e.g., S-NSSAI) corresponding to/associated with the current PDU session in a field/IE (Information Element) that the T-AMF is available to check in the Nsmf_PDUSession_UpdateSMContext Response additionally. The T-AMF may determine whether to transmit the N2 SM information with being included in the handover request to T-RAN based on the slice information. For example, the N2 SM information for the PDU session corresponding to/associated with a slice that the T-AMF is unavailable to support may be transmitted with not being included in the handover request.

Invention proposals 1-1 and 1-2 described above are described with reference to FIG. 6 in detail below. For the convenience of description, Invention proposals 1-1 and 1-2 are combined and described as an embodiment, but the invention proposal is not limited thereto, but Invention proposals 1-1 and 1-2 may be applied/performed as respective independent separate embodiments.

FIG. 6 is a flowchart illustrating handover preparation procedure according to an embodiment of the present disclosure.

The description in FIG. 3 above may be identically/similarly applied to each step of this flowchart, and the overlapped description is omitted. That is, it may be interpreted that the step separately described below corresponds to a modified step in the flowchart of FIG. 3 described above. Particularly, it may be interpreted that steps 1, 3 and 3 in FIG. 6 are steps modified when invention proposal 1-1 is applied, and steps 7, 8 and 10 are steps modified when invention proposal 1-2 is applied.

1. The S-RAN transmits the ID(s) of PDU session(s) to handover with being included in a Handover Request message. In this case, according to invention proposal 1-1, the S-RAN may transmit S-NSSAI in which each PDU session is generated or associated/corresponding with being included.

3. The S-AMF may forward a UE context with a list of PDU sessions to be moved by handover and serving SMF information to serving it to the T-AMF. In this case, in step 1, in the case that the S-AMF receives the S-NSSAI information, the S-AMF may also forward S-NSSAI information corresponding to/associated with each PDU session to the T-AMF together. Such S-NSSAI information may be included in a separate IE/field or included in a UE context.

4. In the case that, according to invention proposal 1-1, the T-AMF receives the PDU session ID and the S-NSSAI information corresponding to/associated with it, the T-AMF may distinguish/identify/determine the S-NSSAI that the T-AMF is unable to support (non-available) through its own information (e.g., context information) and/or other entity (e.g., UDM, NRF, NSSF, etc.) and determine the associated/corresponding PDU session. Such a PDU session may be determined by the PDU session that the T-AMF is unable to support (non-available). In this case, when requesting N2 SM information for the PDU session to be handover to each SMF, the T-AMF does not request it separately to the SMF for the PDU session connected to/associated with/corresponding to the S-NSSAI that the T-AMF itself does not support.

7. In the case of applying invention proposal 1-2, when the SMF transmits Nsmf_PDUSession_UpdateSMContext Response including N2 SM information to the T-AMF, the SMF may forward the S-NSSAI information corresponding to/associated with (handover accepted/allowed) PDU session in the field/IE that the T-AMF may read together.

8. In the case that the service message transmitted by the SMF in step 7 includes the S-NSSAI, the T-AMF may distinguish/identify/determine the S-NSSAI that the T-AMF is unable to support (non-available) through its own information (e.g., context information) and/or a query to other entity (e.g., UDM, NRF, NSSF, etc.), and determine the associated/corresponding PDU session.

In the case that there is/are PDU session(s) associated with/connected to/corresponding to the S-NSSAI that the T-AMF does not support by invention proposal 1-1 and/or 1-2, the T-AMF may not include the corresponding PDU session(s) in the handover request to be transmitted to the T-RAN in step 9. In addition, the T-AMF may store the ID of the corresponding PDU sessions(s), handover reject cause therefor (e.g., Not supported S-NSSAI) and/or Not available S-NSSAI. Particularly, the T-AMF may generate/store/manage the information with being included in a non-accepted PDU session list.

According to a network or a policy of service provider, the T-AMF may inform that the T-AMF does not handover the corresponding PDU session to the SMF that transmits N2 SM information for the PDU session (i.e., handover non-accepted PDU session) which is not included in the handover request owing to a cause of slice support impossible (non-available). This may be performed through/using Nsmf_PDUSession_UpdateSMContext service or Namf_EventExposure_Notify service, and the like.

13. The T-AMF may transmit a response to the Namf_Communication_CreateUEContext Request received in step 3 with 'PDU Sessions failed to be setup list' including at least one PDU session (ID) for which handover accept is impossible to the S-AMF. The 'PDU Sessions failed to be setup list' may be generated by reflecting/based on 'non-accepted PDU session list' generated/memorized/stored by the T-AMF in step 8 as well as the PDU session list for which handover is impossible/non-available from the SMF and/or the T-RAN.

Accordingly, the 'PDU Sessions failed to be setup list' may include the PDU session(s) for which handover is impossible due to the S-NSSAI which is unsupportable and the cause. For example, the T-AMF may include the cause that the S-NSSAI associated with/connected to/corresponding to the PDU session is not supported (Not Supported S-NSSAI) or unusable (Not available S-NSSAI) in the 'PDU Sessions failed to be setup list'.

Invention proposal 2. AMF's decision on PDU session resource to be setup based on S-NSSAI In the case that the T-AMF knows the PDU session list to handover to the T-RAN (or requested from the S-AMF) and the S-NSSAI information associated with/connected to/corresponding to the PDU session by the method proposed in invention proposal 1 or other method, based on this, the T-AMF may further filter the 'PDU Sessions failed to be setup list' in the AMF level once more through an additional procedure.

In the case that the S-AMF receives the PDU session ID and the S-NSSAI information from the S-RAN (e.g., in the case of invention proposal 1-1), the S-AMF may forward it to the T-AMF. This may be forwarded with a separate IE/field form, that is, explicit PDU session information/list and S-NSSAI information/list for each PDU session included in it, or forwarded after stored in UE context, with the entire UE context. The T-AMF may request (Nsmf_PDUSession_UpdateSMContext) N2 SM information to the corresponding SMF for each PDU session ID which is received. In this case, the T-AMF does not start/transmit Nsmf_PDUSession_UpdateSMContext service to the SMF for the PDU session connected to/associated with/corresponding to unsupportable S-NSSAI or the un-allowed S-NSSAI on the UE context among the received PDU session. That is, even in the case that the T-AMF is requested by handover, the T-AMF does not proceed an additional procedure for the PDU session connected to/associated with/corresponding to unsupportable S-NSSAI.

In the case that the SMF forwards correspondence/association/connection information between the PDU session ID and the S-NSSAI (e.g., in the case of invention proposal 1-2), instead of the method described above, the T-AMF may request Nsmf_PDUSession_UpdateSMContext service to the SMF for the all PDU sessions that the T-AMF is requested like the conventional operation. The SMF may respond to the T-AMF through the Nsmf_PDUSession_UpdateSMContext Response service to forward N2 SM information (e.g., including UPF address, TEID, etc.). In this case, the SMF may forward the S-NSSAI information with the N2 SM information for each PDU session in the form that the T-AMF may identify. For example, the SMF may transmit the S-NSSAI information with being included in a specific field (e.g., Nsmf service field) external to the N2 SM information. Based on this information, the T-AMF does not forward the N2 SM information for the PDU session associated with/connected to/corresponding to the S-NSSAI that the T-AMF is unable to support to the T-RAN. That is, when the T-AMF forwards the handover request to the T-RAN, based on the information, the T-AMF may not perform additional handover request for the PDU session connected to/associated with/corresponding to the S-NSSAI unsupportable in the current T-AMF. In this case, the T-AMF may inform that the T-AMF does not forward the N2 SM information for the unsupportable PDU session but stops handover for the corresponding PDU session to the SMF. Alternatively, as proposed in invention proposal 3, this role may be replaced by the PDU session release procedure, and the determination follows a network or a policy of service provider.

As proposed in the invention proposal, in the case that the T-AMF determines a rejection of the additional handover request for a specific PDU session based on slice support information of the AMF, while memorizing this, when transmitting Namf_Communication_CreateUEContext Response to the S-AMF, the T-AMF may forward the corresponding PDU session and the cause specified in the 'PDU Sessions failed to be setup list'. The S-AMF may transmit handover command including the 'PDU Sessions failed to be setup list' to the S-RAN.

Normally, the cause of the 'PDU Sessions failed to be setup list' is specified by a subject that determines handover of a PDU session cannot be performed due to SMF decision, SMF response delay, T-RAN decision, and the like, and the rejection cause may also be specified even in the case that the T-AMF rejects a PDU session based on the slice support information in the same manner. For example, like "Associated S-NSSAI not supported (not available) in T-AMF", information indicating that the corresponding PDU session and the associated/connected/corresponding S-NSSAI is not supported in the T-AMF may be specified/included as a rejection cause.

Invention proposal 3. Release of PDU Session with S-NSSAI not supported

In the handover preparation process according to the invention proposal, in the case that the PDU session associated with/connected to/corresponding to the S-NSSAI that the T-AMF is unable to support is excluded from a handover target, it is required to process the excluded PDU session separately. In the case that the PDU session is simply excluded from the 'PDU Session resource to be setup list', it is switched to UP inactivated state in which UP connection is not generated in a new T-RAN, and in this case, the PDU session is still existed (i.e., context for the corresponding PDU session is remained). Later, when a registration update procedure proceeds through a new AMF, all the PDU session associated with/connected to/corresponding to the S-NSSAI not included in allowed NSSAI are released.

According to determination of a network or a network service provider, the PDU sessions for which handover is unavailable (failed to setup) are required to be released during handover procedure. This is owing to a property of slice, different from LADN, in the case that a UE moves to an area in which a specific slice is not supported by mobility, the service for the slice is unsupportable, it may be resource waste to leave a user context therefor.

In the handover execution procedure, the T-RAN receives Handover Confirm that handover is completed from a UE, and transmits Handover Notify message to the T-AMF. Through this, a core network (T-AMF) identifies that handover at RAN end is completed and sends Nsmf_PDUSession_UpdateSMContext Request to each SMF.

In the case that the (T-)AMF identifies that RAN handover is completed, the AMF may perform a release procedure for the PDU session(s) for which handover is not accepted (i.e., the PDU session(s) transmitted with being included in PDU Sessions resource failed to be setup list to S-AMF/S-RNT in the previous handover preparation procedure), and this may be determined based on particular accept rejection cause and/or network policy. For example, the T-AMF may release the PDU session connected to/associated with/corresponding to the S-NSSAI which is not supportable (non-available) in the T-AMF in the handover execution step.

The T-AMF that receives handover notification from the T-RAN may transmit Nsmf_PDUSession_UpdateSMContext Request to each SMF for the accepted PDU session(s) but may transmit Nsmf_PDUSession_ReleaseSMContext Request for the PDU session(s) for which release is decided. This message may include a cause of release together with a PDU session ID to be released. As the cause of release, for example, information such as 'S-NSSAI not available/supported' may be included.

Later, the SMF may release the corresponding PDU session(s) through the PDU session release procedure as described in TS 23.502 standard.

Invention proposals 2 and 3 described above are described in detail with reference to FIG. 7 below. For the convenience of description, Invention proposals 2 and 3 are combined and described as an embodiment, but the invention proposal is not limited thereto, but Invention proposals 2 and 3 may be applied/performed as respective independent separate embodiments.

FIG. 7 is a flowchart illustrating handover execution procedure according to an embodiment of the present disclosure.

The description in FIG. 4 above may be identically/similarly applied to each step of this flowchart, and the overlapped description is omitted. That is, it may be interpreted that the step separately described below corresponds to a modified step in the flowchart of FIG. 4 described above. Particularly, it may be interpreted that step 1 in FIG. 7 is a step modified when invention proposal 2 is applied, and step 7 is a step modified when invention proposal 3 is applied.

1. When transmitting a handover command to S-RAN, the S-AMF forwards N2 SM information according to the information received from the T-AMF. In this case, the SMF may forward 'PDU Sessions failed to be setup list' and a handover rejection cause for each PDU session together. Here, according to invention proposal 2, the handover rejection cause may correspond to the information that the T-AMF does not support the S-NSSAI associated with/connected to/corresponding to a specific PDU session (Not Supported S-NSSAI) or unavailable to use (Not available S-NSSAI).

7. After receiving handover notification that RAN handover is completed from T-RAN in step 5, the T-AMF may consider additional processing operation for the PDU sessions included in the 'PDU Sessions failed to be setup list'. According to a network or a policy of service provider and/or a cause of PDU session being rejected, the T-AMF requests a release for the corresponding PDU session or does not process any separate additional operation, and the TMF may place the corresponding PDU session in UP inactivated state.

In the case that the T-AMF decides to release a PDU session, the T-AMF may transmit Nsmf_PDUSession_ReleaseSMContext Request to the SMF that manages the corresponding PDU session and may request a PDU session release. In this case, the TMF may specify a release cause. For example, in the case that the S-NSSAI associated with/connected to/corresponding to a specific PDU session is not supported in the T-AMF, the TMF may specify/inform the release cause that it is released owing to unavailable to support/use the S-NSSAI such as "Associated with Not Supported S-NSSAI" or "Associated with Not Available S-NSSAI". The PDU session release operation according to it may be performed according to the PDU session release procedure described in TS 23.502 standard.

FIGS. 8 to 10 are diagrams illustrating handover request procedure of T-AMF according to an embodiment of the present disclosure. Particularly, the drawings relate to procedure for requesting handover only for the S-NSSAI supportable in the current T-AMF, before the T-AMF requests to the SMF in invention proposal 1-1 or before the T-AMF transmits handover request to the T-RAN in invention proposal 1-2.

The T-AMF on the timing when receiving content create request from the S-AMF or after receiving a response from the SMF may know a PDU session ID of the PDU session of handover request target and SMF information for serving the corresponding PDU session (e.g., SMF ID or address), and/or S-NSSAI information connected to/associated with/corresponding to the PDU session (e.g., first S-NSSAI set). The T-AMF may progress various following procedures as below based on the information which is currently known as such.

1) Referring to FIG. 8, in the case that the T-AMF has only the S-NSSAI information that the T-AMF itself may support currently without regard to a UE (e.g., second S-NSSAI set), the T-AMF may perform an operation of comparing the first S-NSSAI set and the second S-NSSAI set. As a result, the T-AMF may derive S-NSSAIs of the first S-NSSAI set that are not included in the second S-NSSAI set (e.g., third S-NSSAI set). This may be represented by the equation; (third S-NSSAI set)=[(first S-NSSAI set) ∩(second S-NSSAI set)]−(second S-NSSAI set). This may be regarded as a determination based on a support capability of the T-AMF without regard to the subscription information of UE.

2) Referring to FIG. 9, the T-AMF may have the S-NSSAI included the subscription information of UE together with the second S-NSSAI set, that is, subscribed S-NSSAI information (e.g., fourth S-NSSAI set). Alternatively, for this, the T-AMF may progress a procedure of requesting and receiving the subscription information of UE to/from the UDM. That is, in the case that the T-AMF does not have the fourth S-NSSAI set, the T-AMF may receive information from the UDM to create it. Likewise, in the operation of determining for the first S-NSSAI set, the T-AMF may further consider the fourth S-NSSAI set as well as the second S-NSSAI set. In this case, the T-AMF may determine values not included in both the second S-NSSAI set and the fourth S-NSSAI set among the values included in the first S-NSSAI set (e.g., fifth S-NSSAI set). This may be represented by the equation; (fifth S-NSSAI set)=[(first S-NSSAI set) ∩(second S-NSSAI set) ∩(third S-NSSAI set)]−[(second S-NSSAI set) ∩(third S-NSSAI set)]. The fifth S-NSSAI may be regarded as a value having support capability in the T-AMF among the S-NSSAIs allowed in the UE on the subscription information of UE.

3) Referring to FIG. 10, the T-AMF may determine handover request based on the NSSAI allowed in a Registration Area managed by the corresponding T-AMF together with the second S-NSSAI. In this case, the T-AMF may further consider dynamic policy or situation as well as the capability information of the T-AMF and the subscription information of UE. Such an allowed NSSAI value may be based on NSSF (Network Slice Selection Function) and/or a value (Allowed NSSAI) received from NRF (Network Repository Function) in the case that the T-AMF has been serving the UE previously and progressed a registration procedure. Otherwise (i.e., the T-AMF odes not have the allowed NSSIA information for UE), the T-AMF may progress a procedure of receiving it from NSSF and/or NRF to obtain the information. Based on the allowed NSSAI value, the T-AMF may compare the first S-NSSAI set and the NSSAI values included in the allowed NSSAI and derive a value which is not included in the allowed NSSAI among the values included in the first S-NSSAI set (e.g., sixth S-NSSAI set). This may be represented by the equation; (sixth S-NSSAI set)=[(first S-NSSAI set) ∩(allowed S-NSSAI set)]–(allowed S-NSSAI set).

The T-AMF may derive/obtain the S-NSSI set (e.g., third, fifth and/or sixth S-NSSAI set) that should be rejected in the T-AMF through at least one of three determination method described above according to the standard, a network or determination or policy of service provider. Later, the T-AMF may determine/identify the PDU session connected to/associated with/corresponding to the S-NSSAI included in the rejection S-NSSAI list among the lists of the PDU sessions for which handover is requested. That is, the T-AMF may determine/decide a list of PDU session for which handover is impossible owing to a cause such as slice support unavailable and manage it.

FIG. 11 is a flowchart illustrating a method for supporting UE handover of T-AMF according to an embodiment of the present disclosure. Regarding to this flowchart, the embodiments and description described above may be identically/similarly applied, and repeated description is omitted. In addition, in this flowchart, at least one step may be selectively applied, or a new step may be added according to an embodiment.

First, a T-AMF may receive a create UE context request message (corresponds to Namf_Communication_CreateUEContext Request described above) from a S-AMF (step, S1110). In this case, the create UE context request message may include a PDU session ID which is a target of handover and S-NSSAI corresponding to each PDU session ID.

Next, the T-AMF may determine whether the corresponding S-NSSAI is available in the T-AMF (step, S1120).

Later, among the PDU session IDs, based on a result of the determination in step S1120, the T-AMF may transmit a PDU session update SM context request message to the SMF only for the PDU session ID corresponding to the S-NSSAI determined to be available.

More particularly, in the case that the S-NSSAI is determined to be available in the T-AMF, the T-AMF may transmit the PDU session update SM context request message (corresponds to Nsmf_PDUSession_UpdateSMContext Request described above) to the SMF for the PDU session ID corresponding to/associated with/connected to the corresponding S-NSSAI (step, S1130). Here, the SMF may be a network node that determines whether handover for the PDU session ID corresponding to the S-NSSAI determined to be available is accepted. In the case that it is determined that the S-NSSAI is not available in the T-AMF, the T-AMF may perform a release procedure for the PDU session ID corresponding to/associated with/connected to the corresponding S-NSSAI (step, S1140). Particularly, the PDU session non-accepted by the T-AMF may be released after receiving a handover notification indicating handover is completed from the T-RAN. The release may be triggered based on a PDU session release SM context request message including the PDU session non-accepted by the T-AMF being transmitted to the SMF.

In addition, although it is not shown in the flowchart, the T-AMF may receive a PDU session update SM context response message (corresponds to Nsmf_PDUSession_UpdateSMContext Response described above) in response to the PDU session update SM context request message. In this case, the PDU session update SM context response message may include a PDU session ID of which handover is accepted by the SMF.

In addition, although it is not shown in the flowchart, the T-AMF may generate/memorize/store the non-accepted PDU session list (corresponds to PDU session failed to be setup list described above) including a PDU session ID for which handover is not accepted by the T-AMF and/or the SMF and a cause of non-acceptance for the PDU session ID for which handover is not accepted. Here, the PDU session ID for which handover is not accepted by the T-AMF may be a PDU session ID corresponding to the S-NSSAI determined to be non-available based on the result of the determination. Accordingly, the cause of non-acceptance of handover may include a cause indicating that the handover is not accepted by the T-AMF because of the non-available S-NSSAI in the T-AMF. As such, the non-accepted PDU session list generated/memorized/stored by the T-AMF may be forwarded to T-RAN.

FIG. 12 is a block diagram illustrating a T-AMF supporting UE handover according to an embodiment of the present disclosure. In relation to this block diagram, the description of FIG. 11 may be identically/similarly applied, and repeated description is omitted.

A T-AMF 1200 may include a component/unit 1210 for receiving a create UE context request message, a component/unit 1220 for determining whether the S-NSSAI is available in the T-AMF, a component/unit 1230 for transmitting the PDU session update SM context request message to a SMF for the PDU session ID corresponding to the S-NSSAI and/or a component/unit 1230 for releasing the PDU session corresponding to the S-NSSAI.

The components/units 1130 to 1240 of the T-AMF 1200 may be components/units configured to perform steps S1110 to S1140 of the flowchart of FIG. 11, respectively. Each component/unit may be constructed as hardware component/part, and may correspond to a processor, a memory and/or a communication module or a combination of them described in FIG. 13 and FIG. 14 below.

Apparatus to which the Present Disclosure May be Applied

FIG. 13 illustrates a block diagram of a communication apparatus according to an embodiment of the present disclosure.

Referring to FIG. 13, a wireless communication system includes a network node 1310 and a plurality of UEs (UE) 1320.

The network node 1310 includes a processor 1311, a memory 1312, and a communication module 1313. The processor 1311 implements the previously proposed functions, processes and/or methods. The layers of the wired/wireless interface protocol may be implemented by the processor 1311. The memory 1312 is connected to the processor 1311 and stores various information for driving the processor 1311. The communication module 1313 is connected to the processor 1311 to transmit and/or receive a wired/wireless signal. Some examples of the network node 1310 may include a base station, an MME, an HSS, an SGW, a PGW, and an application server. In particular, when the network node 1310 is a base station, the communication module 1313 may include a radio frequency unit for transmitting/receiving a radio signal.

The UE 1320 includes a processor 1321, a memory 1314 and a communication module (or RF section). Processor 1321 implements the previously proposed functions, processes and/or methods. The layers of the wireless interface protocol may be implemented by the processor 1321. The memory 1314 is connected to the processor 1321 and stores various information for driving the processor 1321. The communication module 1323 is coupled to processor 1321 to transmit and/or receive wireless signals.

The memories 1312 and 1314 may be located inside or outside the processors 1311 and 1321 and may be coupled to the processors 1311 and 1321 by various well known means. Also, the network node 1310 (in the case of a base station) and/or the UE 1320 may have a single antenna or multiple antennas.

FIG. 14 shows a block diagram of a communication apparatus according to an embodiment of the present disclosure.

Specifically, FIG. 14 is a more detailed diagram of the UE of FIG. 13.

Referring to FIG. 14, the UE may include a processor (or digital signal processor (DSP)) 1410, an RF module (or RF unit) 1435, a power management module 1405, an antenna 1440, a battery 1455, a display 1415, a keypad 1420, memory 1430, a subscriber identification module (SIM) card 1425 (this element is optional), a speaker 1445 and a microphone 1450. The UE may also include a single antenna or multiple antennas.

The processor 1410 implements the functions, processes and/or methods proposed above. The layers of a radio interface protocol may be implemented by the processor 1410.

The memory 1430 is connected to the processor 1410 and stores information related to the operation of the processor 1410. The memory 1430 may be located inside or outside the processor 1410 and may be connected to the processor 1410 by well-known various means.

A user inputs command information, such as a telephone number, by pressing (or touching) a button of the keypad 1420 or by voice activation using the microphone 1450, for example. The processor 1410 processes a proper function, such as receiving such command information or making a call to a telephone number, so that the function is performed. Operational data may be extracted from the SIM card 1425 or the memory 1430. Furthermore, the processor 1410 may display command information or driving information on the display 2135 so that a user can recognize the information or for convenience.

The RF module 1435 is connected to the processor 1410 and transmits and/or receives RF signals. The processor 1410 transfers command information to the RF module 1435 so that a radio signal forming voice communication data, for example, is transmitted in order to initiate communication. The RF module 1435 includes a receiver and a transmitter in order to transmit and receive radio signals. The antenna 1440 functions to transmit and receive radio signals. When the RF module 1435 receives a radio signal, it transfers the signal for the processing of the processor 1410 and may convert the signal into a baseband. The processed signal may be converted into audible or readable information through the speaker 1445.

In the aforementioned embodiments, the elements and characteristics of the present disclosure have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present disclosure. Order of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

In this specification, 'A and/or B' can be interpreted to mean 'at least one of A and(or) B.'

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

The present disclosure applied to a 3GPP LTE/LTE-A/NR (5G) system is primarily described as an example but may be applied to various wireless communication systems in addition to the 3GPP LTE/LTE-A/NR (5G).

The invention claimed is:

1. A method for supporting a User Equipment (UE) handover of a Target-Access and Mobility Management Function (T-AMF) in a wireless communication system, the method comprising:

receiving, from a Source-AMF (S-AMF), a create UE context request message, wherein the create UE context request message includes Packet Data Unit (PDU) session Identifiers (IDs) which are related to a target of handover and Single-Network Slice Selection Assistance Information (S-NSSAI) corresponding to each of the PDU session IDs;

determining whether the S-NSSAI corresponding to each of the PDU session IDs is available in the T-AMF;

transmitting a PDU session update Session Management (SM) context request message to a Session Management Function (SMF), only for the PDU session ID corresponding to the S-NSSAI determined to be available in the T-AMF among the PDU session IDs;

receiving a PDU session update SM context response message in response to the PDU session update SM context request message, wherein the PDU session update SM context response message includes a PDU session ID of which handover is accepted by the SMF; and generating a non-accepted PDU session list including (i) a PDU session ID for which handover is not accepted by the T-AMF and/or the SMF, (ii) and a cause of non-acceptance for the PDU session ID for which handover is not accepted, wherein the SMF is a network node that determines whether handover for the PDU session ID corresponding to the S-NSSAI determined to be available is accepted, wherein the cause of non-acceptance of handover includes information representing that the handover is not accepted by the T-AMF because the PDU session is related to an S-NSSAI which is determined to be not available in the T-AMF, and wherein the non-accepted PDU session list is transmitted to a Source-Radio Access Network (S-RAN).

2. The method of claim 1, wherein the PDU session non-accepted by the T-AMF is released after receiving a handover notification indicating handover is completed from a Target-Radio Access Network (T-RAN).

3. The method of claim 2, wherein the release is triggered based on a PDU session release SM context request message including the PDU session non-accepted by the T-AMF being transmitted to the SMF.

4. A Target-Access and Mobility Management Function (T-AMF) for supporting a User Equipment (UE) handover in a wireless communication system, comprising:
a transceiver for transmission and receiving a signal; and
a processor for controlling the transceiver,
wherein the processor is configured to:
receive, from a Source-AMF (S-AMF), a create UE context request message, wherein the create UE context request message includes Packet Data Unit (PDU) session Identifiers (IDs) which are related to a target of handover and Single-Network Slice Selection Assistance Information (S-NSSAI) corresponding to each of the PDU session IDs; and
determine whether the S-NSSAI corresponding to each of the PDU session IDs is available in the T-AMF; and
transmit a PDU session update Session Management (SM) context request message to a Session Management Function (SMF), only for the PDU session ID corresponding to the S-NSSAI determined to be available in the T-AMF among the PDU session IDs;
receive a PDU session update SM context response message in response to the PDU session update SM context request message, wherein the PDU session update SM context response message includes a PDU session ID of which handover is accepted by the SMF, and
generate a non-accepted PDU session list including (i) a PDU session ID for which handover is not accepted by the T-AMF and/or the SMF, (ii) and a cause of non-acceptance for the PDU session ID for which handover is not accepted,
wherein the SMF is a network node that determines whether handover for the PDU session ID corresponding to the S-NSSAI determined to be available is accepted,
wherein the cause of non-acceptance of handover includes information representing that the handover is not accepted by the T-AMF because the PDU session is related to an S-NSSAI which is determined to be not available in the T-AMF, and
wherein the non-accepted PDU session list is transmitted to a Source-Radio Access Network (S-RAN).

\* \* \* \* \*